(12) United States Patent
Qiao et al.

(10) Patent No.: US 11,576,030 B2
(45) Date of Patent: *Feb. 7, 2023

(54) USER PLANE GATEWAY UPDATING METHOD AND APPARATUS

(71) Applicant: Huawei Technologies Co., Ltd., Shenzhen (CN)

(72) Inventors: Xiaoqiang Qiao, Shenzhen (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

This patent is subject to a terminal disclaimer.

(21) Appl. No.: 17/360,877

(22) Filed: Jun. 28, 2021

(65) Prior Publication Data

US 2021/0400463 A1 Dec. 23, 2021

Related U.S. Application Data

(63) Continuation of application No. 16/678,050, filed on Nov. 8, 2019, now Pat. No. 11,051,157, which is a (Continued)

(51) Int. Cl.
*H04W 8/08* (2009.01)
*H04W 88/16* (2009.01)
(Continued)

(52) U.S. Cl.
CPC .......... *H04W 8/08* (2013.01); *H04W 36/0011* (2013.01); *H04W 64/00* (2013.01);
(Continued)

(58) Field of Classification Search
CPC ... H04W 8/08; H04W 36/0011; H04W 64/00; H04W 64/003; H04W 76/12;
(Continued)

(56) References Cited

U.S. PATENT DOCUMENTS

2009/0252133 A1 10/2009 Watanabe et al.
2012/0140738 A1 6/2012 Zembutsu et al.
(Continued)

FOREIGN PATENT DOCUMENTS

CN 102868994 A 1/2013
CN 104427476 A 3/2015
(Continued)

OTHER PUBLICATIONS

1. U.S. Appl. No. 16/678,050, filed Nov. 8, 2019.
2. U.S. Appl. No. 15/897,078, filed Feb. 14, 2018.
(Continued)

*Primary Examiner* — Thai Nguyen
(74) *Attorney, Agent, or Firm* — Leydig, Voit & Mayer, Ltd.

(57) ABSTRACT

The present disclosure provides a user plane gateway updating method and apparatus, so as to resolve a prior-art technical problem that GW-U updating cannot be implemented when neither an MME nor a GW-C changes. Embodiments of the present disclosure provide four different solutions, for purposes of being compatible with an existing implementation mechanism and improving system efficiency, when a UE performs TAU, an EPS system of a distributed gateway can select, according to a current location of the UE, a best GW-U and re-establish a PDN connection, thereby optimizing a data transmission path and ensuring communication performance.

20 Claims, 16 Drawing Sheets

A mobility management entity MME receives a first message that is used to indicate that a first packet data network PDN connection is established and that is sent by a control plane gateway GW-C, where the first PDN connection is a PDN connection between user equipment UE and a first user plane gateway GW-U, and the first message carries a TA identifier list corresponding to the first GW-U — 801

The MME determines that a TA identifier of a tracking area TA in which the UE is located is not in the TA identifier list — 802

The MME sends, to the UE, a request message of re-establishing a PDN connection, where the request message is used to trigger the UE to initiate a second PDN connection, and the second PDN connection is a PDN connection between the UE and a second GW-U — 803

Related U.S. Application Data continuation of application No. 15/897,078, filed on Feb. 14, 2018, now Pat. No. 10,484,859, which is a continuation of application No. PCT/CN2015/087256, filed on Aug. 17, 2015.

(51) Int. Cl.
*H04W 64/00* (2009.01)
*H04W 76/12* (2018.01)
*H04W 76/19* (2018.01)
*H04W 36/00* (2009.01)

(52) U.S. Cl.
CPC ......... *H04W 64/003* (2013.01); *H04W 76/12* (2018.02); *H04W 76/19* (2018.02); *H04W 88/16* (2013.01)

(58) Field of Classification Search
CPC ..... H04W 76/19; H04W 88/16; H04W 76/11; H04W 28/0804; H04W 8/06
See application file for complete search history.

(56) References Cited

U.S. PATENT DOCUMENTS

| | | |
|---|---|---|
| 2013/0010756 A1 | 1/2013 | Liang et al. |
| 2013/0012243 A1 | 1/2013 | Nishida et al. |
| 2013/0142122 A1* | 6/2013 | Eipe ...................... H04W 48/20 370/328 |
| 2015/0110095 A1* | 4/2015 | Tan ..................... H04L 61/5007 370/338 |
| 2015/0208291 A1 | 7/2015 | Lee et al. |
| 2015/0334606 A1 | 11/2015 | Sun et al. |
| 2016/0316515 A1 | 10/2016 | Long |
| 2017/0099619 A1 | 4/2017 | Yin et al. |

FOREIGN PATENT DOCUMENTS

| | | | |
|---|---|---|---|
| CN | 104684044 A | 6/2015 | |
| CN | 104704866 A | 6/2015 | |
| EP | 2854475 A1 | 4/2015 | |
| EP | 3073789 A1 * | 9/2016 | ............ H04W 36/10 |
| EP | 3073789 A1 | 9/2016 | |
| EP | 3076706 A1 | 10/2016 | |
| JP | 2015515234 A | 5/2015 | |
| JP | 2016528812 A | 9/2016 | |
| KR | 20070080991 A | 8/2007 | |
| RU | 2533316 C2 | 11/2014 | |
| WO | 2011034173 A1 | 3/2011 | |
| WO | 2014000286 A1 | 1/2014 | |
| WO | 2014183696 A1 | 11/2014 | |
| WO | 2014183715 A1 | 11/2014 | |
| WO | 2015013094 A1 | 1/2015 | |
| WO | 2015035917 A1 | 3/2015 | |
| WO | 2015069551 A1 | 5/2015 | |
| WO | 2015100638 A1 | 7/2015 | |
| WO | 2015100996 A1 | 7/2015 | |

OTHER PUBLICATIONS

Katanekwa et al., "Enhanced Gateway Selection for Optimal Routing in a Distributed Evolved Packet Core (EPC) Network," 10th International Conference on Electrical Engineering/Electronics, Computer Telecommunications and Information Technology, Krabi, Thailand, pp. 1-6 (May 15-17, 2013).

* cited by examiner

USER PLANE GATEWAY UPDATING METHOD AND APPARATUS

CROSS-REFERENCE TO RELATED APPLICATIONS

This application is a continuation of U.S. application Ser. No. 16/678,050, filed on Nov. 8, 2019, now U.S. Pat. No. 11,051,157, which is a continuation of U.S. application Ser. No. 15/897,078, filed on Feb. 14, 2018, now U.S. Pat. No. 10,484,859, which is a continuation of International Patent Application No. PCT/CN2015/087256, filed on Aug. 17, 2015. All of the afore-mentioned patent applications are hereby incorporated by reference in their entireties.

TECHNICAL FIELD

Embodiments of the present disclosure relate to the field of communications technologies, and in particular, to a user plane gateway updating method and apparatus.

BACKGROUND

System architecture evolution (SAE) is an upgrade plan of the 3GPP for a core network architecture of an LTE wireless communications standard. An SAE architecture is shown in FIG. 1. For the SAE architecture, if a UE moves across TAs, the UE triggers a tracking area update (TAU). When neither an MME nor an S-GW changes, in a process of executing a TAU procedure, there is not any signaling interaction between the MME and the S-GW. A TA (Tracking Area) is a geographical area formed by continuously covered cells, and is used to manage a location of a UE that is in an idle state.

In the SAE architecture, a gateway still needs to keep a large quantity of external signaling interfaces. The large quantity of external signaling interfaces of the gateway bring a large amount of interface signaling. A gateway that uses a dedicated hardware platform does not have strong signaling processing performance, and therefore, easily becomes a bottleneck. Software-defined networking (SDN) provides an effective way to resolve the bottleneck problem of the gateway in signaling processing. An SDN-based SAE architecture is shown in FIG. 2.

With the rapid development of a mobile Internet and the popularity of intelligent terminals, mobile traffic presents a trend of an explosive growth. In order to avoid pressure that a growth in mobile traffic brings to a core network, a mobile gateway presents a trend of gradual downward deployment and distributed deployment. For the SDN-based SAE architecture shown in FIG. 2, GW-Us are further moved downwards and deployed in a distributed manner, implementing an architecture of distributed GW-U deployment shown in FIG. 3.

However, in a distributed gateway architecture, in a process of executing a TAU procedure, it may be necessary to select a new GW-U and establish a new PDN (packet data network) connection for a UE. Because an MME cannot obtain information about GW-U deployment, GW-U updating cannot be implemented when neither the MME nor a GW-C changes.

SUMMARY

Embodiments of the present disclosure provide a user plane gateway updating method and apparatus, so as to resolve a prior-art technical problem that GW-U updating cannot be implemented when neither an MME nor a GW-C changes.

A first aspect of the embodiments of the present disclosure provides a user plane gateway updating method, including:

sending, by a control plane gateway GW-C to a mobility management entity MME, a first message that is used to indicate that a first packet data network PDN connection is established, where the first PDN connection is a PDN connection between a user equipment UE and a first user plane gateway GW-U, the first message carries a notification parameter, and the notification parameter is used to request the MME to notify the GW-C when a tracking area TA in which the UE is located changes;

receiving, by the GW-C, a notification message sent by the MME, where the notification message is used to notify the GW-C that the tracking area TA in which the UE is located changes;

determining, by the GW-C according to the notification message, that a new TA in which the UE is located is corresponding to a second GW-U, where the second GW-U is different from the first GW-U;

sending, by the GW-C to the MME, a request message of re-establishing a PDN connection, where the request message is used to request the MME to trigger the UE to initiate a second PDN connection, and the second PDN connection is a PDN connection between the UE and the second GW-U; and establishing, by the GW-C, the second PDN connection by using the second GW-U.

With reference to the first aspect, in a first possible implementation of the first aspect, the sending, by the GW-C to the MME, a request message of re-establishing a PDN connection includes:

sending, by the GW-C to the MME, the request message of re-establishing a PDN connection, where the request message is used to indicate the MME to delete the first PDN connection, and the request message carries a parameter that is used to indicate the UE to establish the second PDN connection.

A second aspect of the embodiments of the present disclosure provides a user plane gateway updating method, including:

sending, by a control plane gateway GW-C to a mobility management entity MME, a first message that is used to indicate that a first packet data network PDN connection is established, where the first PDN connection is a PDN connection between a user equipment UE and a first user plane gateway GW-U, and the first message carries a TA identifier list corresponding to the first GW-U;

receiving, by the GW-C, a notification message that the MME sends according to the first message, where the notification message is used to notify the GW-C that a TA identifier of a tracking area TA in which the UE is located is not in the TA identifier list;

sending, by the GW-C to the MME, a request message of re-establishing a PDN connection, where the request message is used to request the MME to trigger the UE to initiate a second PDN connection, and the second PDN connection is a PDN connection between the UE and a second GW-U; and establishing, by the GW-C, the second PDN connection by using the second GW-U.

With reference to the second aspect, in a first possible implementation of the second aspect, the sending, by the GW-C to the MME, a request message of re-establishing a PDN connection includes:

sending, by the GW-C to the MME, the request message of re-establishing a PDN connection, where the request message is used to indicate the MME to delete the first PDN connection, and the request message carries a parameter that is used to indicate the UE to establish the second PDN connection.

A third aspect of the embodiments of the present disclosure provides a user plane gateway updating method, including:

receiving, by a mobility management entity MME, a first message that is used to indicate that a first packet data network PDN connection is established and that is sent by a control plane gateway GW-C, where the first PDN connection is a PDN connection between a user equipment UE and a first user plane gateway GW-U, and the first message carries a TA identifier list corresponding to the first GW-U;

determining, by the MME, that a TA identifier of a tracking area TA in which the UE is located is not in the TA identifier list; and sending, by the MME to the UE, a request message of re-establishing a PDN connection, where the request message is used to trigger the UE to initiate a second PDN connection, and the second PDN connection is a PDN connection between the UE and a second GW-U.

With reference to the third aspect, in a first possible implementation of the third aspect, the sending, by the MME to the UE, a request message of re-establishing a PDN connection includes:

sending, by the MME, a request message of disconnecting the first PDN connection, where the request message carries a parameter that is used to indicate the UE to establish the second PDN connection.

A fourth aspect of the embodiments of the present disclosure provides a user plane gateway updating method, including:

after a tracking area TA in which a user equipment UE is located changes, determining, by a mobility management entity MME, that an original TA in which the UE is located is corresponding to a first TA identifier, and determining that a new TA in which the UE is located is corresponding to a second TA identifier, where a first PDN connection is established between the UE and a first GW-U;

determining, by the MME according to a pre-stored correspondence between each GW-U identifier and a tracking area TA identifier list, that a TA list in which the first TA identifier is corresponding to a first GW-U identifier, and determining that a TA list in which the second TA identifier is corresponding to a second GW-U identifier; and when the first GW-U corresponding to the first GW-U identifier is different from a second GW-U corresponding to the second GW-U identifier, sending, by the MME to the UE, a request message of re-establishing a PDN connection, where the request message is used to trigger the UE to initiate a second PDN connection, and the second PDN connection is a PDN connection between the UE and the second GW-U.

With reference to the fourth aspect, in a first possible implementation of the fourth aspect, the sending, by the MME to the UE, a request message of re-establishing a PDN connection includes:

sending, by the MME to the UE, a request message of disconnecting the first PDN connection, where the request message carries a parameter that is used to indicate the UE to establish the second PDN connection.

One or more technical solutions provided in the embodiments of the present disclosure have at least the following technical effects or advantages:

In the embodiments of the present disclosure, for a distributed gateway architecture, when the UE performs TAU, first, the GW-C or the MME determines that a GW-U corresponding to the new TA is different from a GW-U in an established PDN connection; then, the UE triggers PDN connection re-establishment; and the GW-C selects a new GW-U to complete the PDN connection re-establishment. This optimizes a data transmission path and ensures communication performance.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
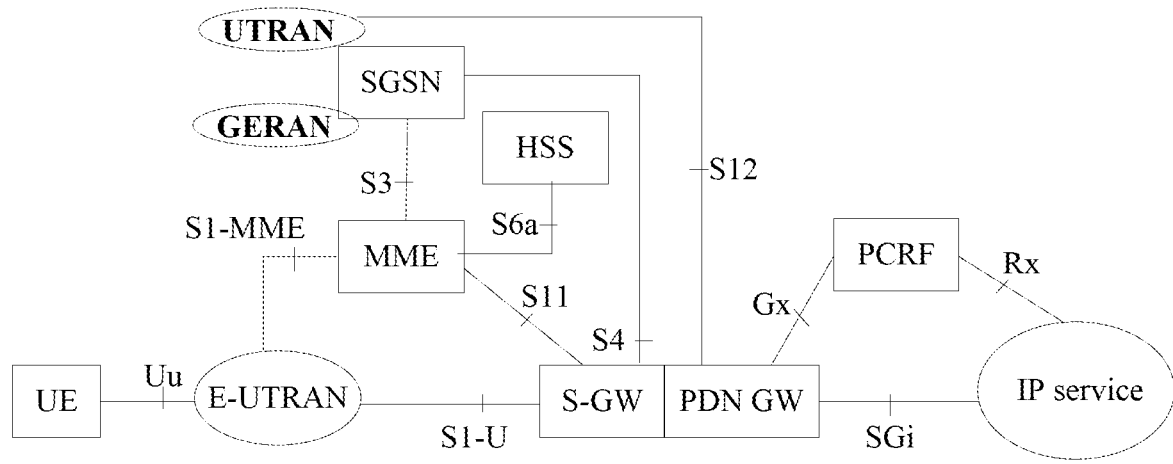
FIG. 1 is a schematic diagram of an SAE architecture in the prior art.
Figure 2:
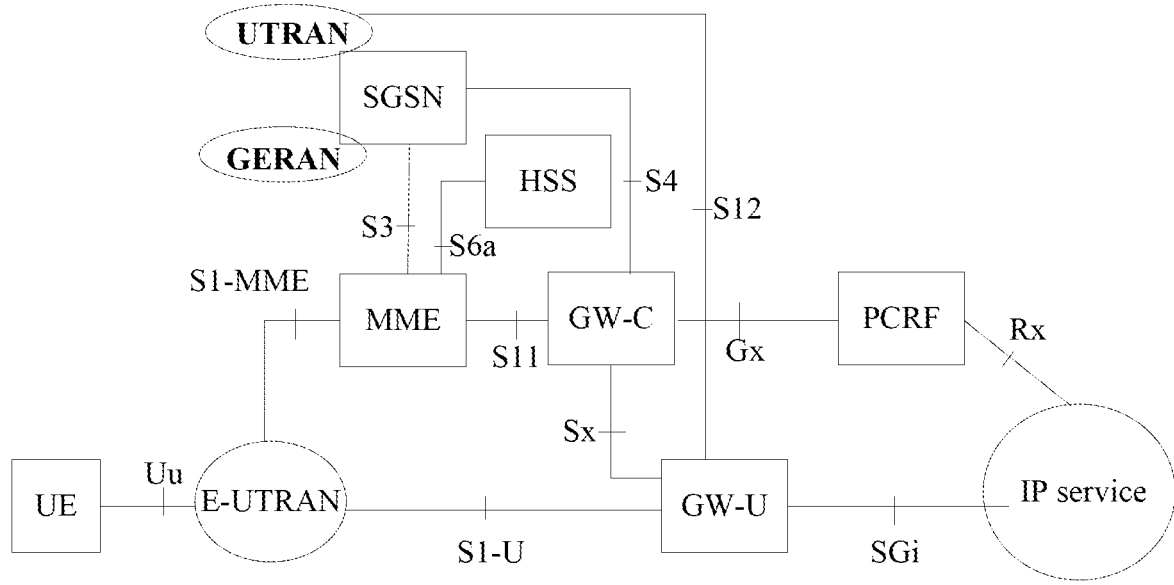
FIG. 2 is a schematic diagram of an SDN-based SAE architecture in the prior art.
Figure 3:
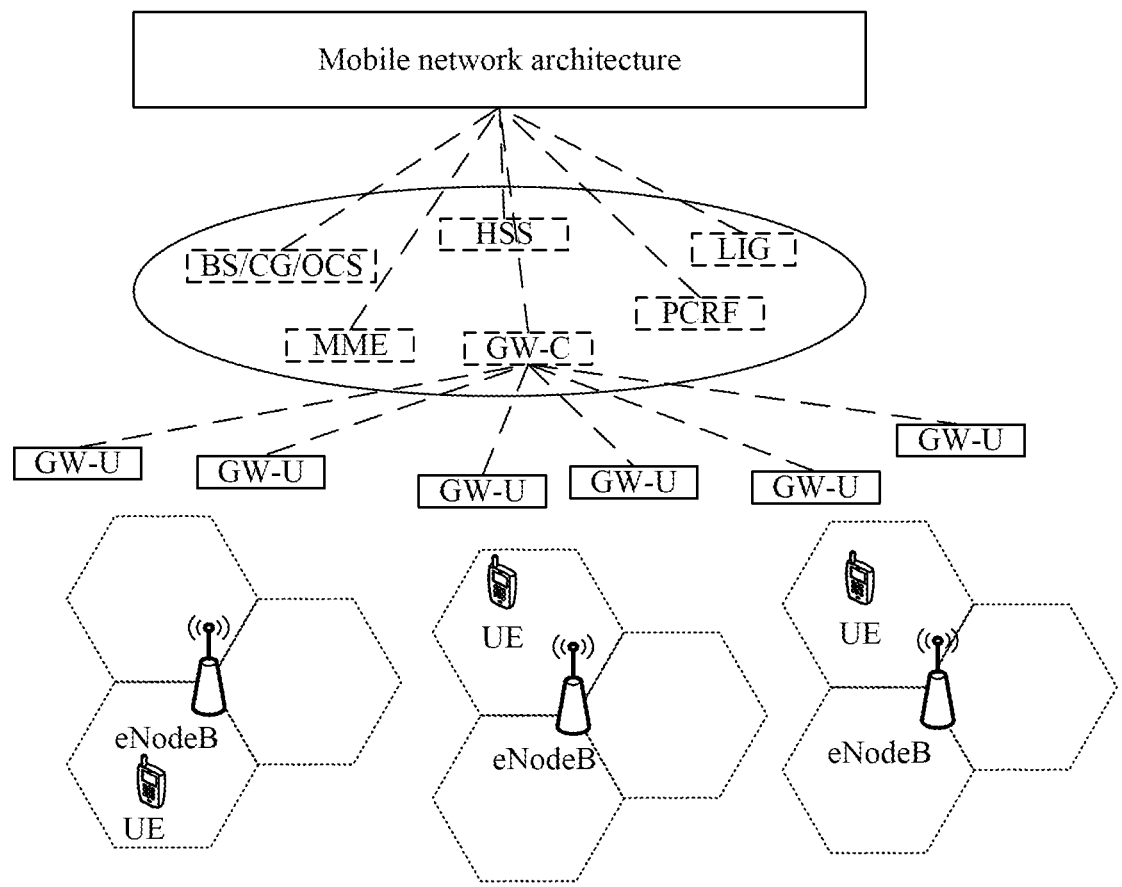
FIG. 3 is a schematic diagram of a distributed gateway architecture in the prior art.

Referring to FIG. 3, a distributed gateway architecture shown in FIG. 3 is applicable to a user plane gateway updating method according to an embodiment of the present disclosure. The following briefly describes main network elements in FIG. 3.

A UE (user equipment), also referred to as a mobile terminal, mobile user equipment, or the like, may communicate with one or more core networks (CN) by using a radio access network (RAN). The user equipment may be, for example, a mobile phone or a computer with a mobile terminal, such as a portable, pocket-sized, handheld, computer built-in, or in-vehicle mobile apparatus. For example, the user equipment may be a mobile phone, an intelligent terminal, a multimedia device, or a streaming media device.

An eNodeB (evolved Node B) is a wireless base station in an LTE network. The eNodeB is an only network element in an LTE radio access network and is responsible for all functions related to an air interface. The eNodeB may alternatively be a base station (BTS, Base Transceiver Station) in GSM or CDMA, or may be a base station (NodeB) in WCDMA, or a network device that implements a similar function in a subsequent evolved system, which is not limited in the present disclosure. It should be noted that a corresponding change made for a form of a network device according to an actual network deployment requirement, for example, using a distributed base station, is also within the protection scope of the present disclosure.

An MME (mobility management entity) is a network element, in an LTE core network, that is responsible for processing signaling. The MME is responsible for mobility management in a control plane, including user context and mobile status management.

GW-Cs (control plane gateway) are deployed together. The GW-C is responsible for processing an external signaling interaction, including GTP-C signaling between the GW-C and an MME and signaling between the GW-C and another network element.

GW-Us (user plane gateway) are deployed in a distributed manner. The GW-U is configured to forward a user data packet according to context information indicated by the GW-C.

The embodiments of the present disclosure mainly propose two mechanisms for implementing GW-U updating. The two mechanisms are separately described as follows:

In a first mechanism, in a process of executing a TAU procedure, the MME notifies the GW-C by using a predetermined mechanism, and the GW-C initiates a PDN release and re-establishment procedure to complete GW-U updating.

In a second mechanism, the MME obtains a mapping relationship between a GW-U and a TA in advance, and in a process of executing a TAU procedure, the MME proactively initiates a PDN release and re-establishment procedure to complete GW-U updating.

Embodiment 1

Figure 4:
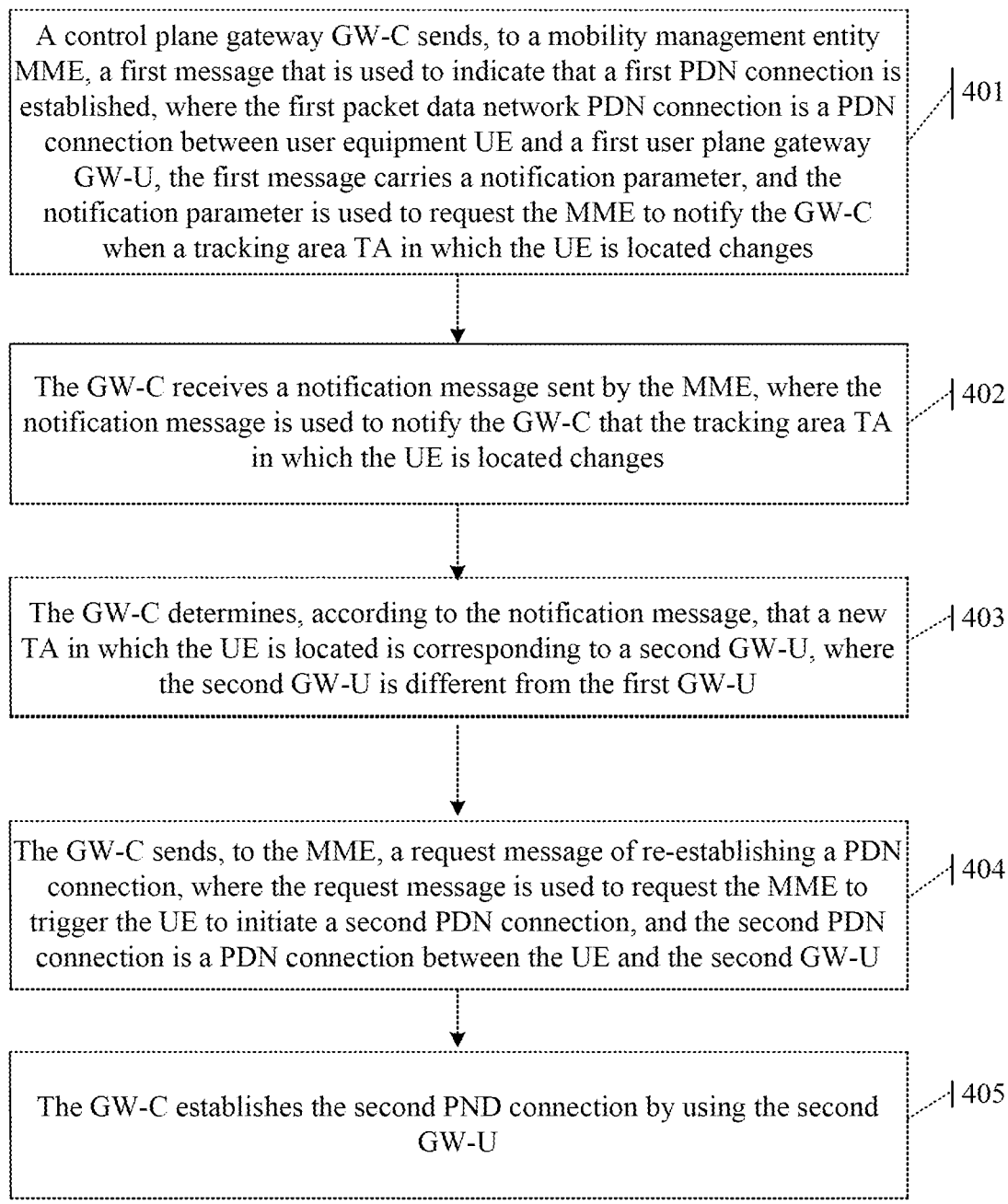
FIG. 4 is a flowchart of a first distributed gateway updating method according to an embodiment of the present disclosure.

Embodiment 1 details how GW-U updating is implemented in a first mechanism. As shown in FIG. 4, in the first mechanism, a first method for implementing GW-U updating includes the following steps.

Step 401: A control plane gateway GW-C sends, to a mobility management entity (MME), a first message that is used to indicate that a first PDN connection is established, where the first PDN connection is a PDN connection between a UE and a first user plane gateway GW-U, the first message carries a notification parameter, and the notification parameter is used to request the MME to notify the GW-C when a TA in which the UE is located changes.

Step 402: The GW-C receives a notification message sent by the MME, where the notification message is used to notify the GW-C that the tracking area TA in which the UE is located changes.

Step 403: The GW-C determines, according to the notification message, that a new TA in which the UE is located is corresponding to a second GW-U, where the second GW-U is different from the first GW-U.

Step 404: The GW-C sends, to the MME, a request message of re-establishing a PDN connection, where the request message is used to request the MME to trigger the UE to initiate a second PDN connection, and the second PDN connection is a PDN connection between the UE and the second GW-U.

Step 405: The GW-C establishes the second PDN connection by using the second GW-U.

That the GW-C sends, to the MME, a request message of re-establishing a PDN connection includes:

the GW-C sends, to the MME, the request message of re-establishing a PDN connection, where the request message is used to indicate the MME to delete the first PDN connection, and the request message carries a parameter that is used to indicate the UE to establish the second PDN connection.

Specifically, in a process in which the UE attaches to a network or in a process in which the first PDN connection between the UE and the first GW-U is being established, the GW-C sends a change reporting action parameter to the MME, to request the MME to notify the GW-C when the TA in which the UE is located changes. If the UE triggers execution of a TAU procedure, the MME sends a change notification message to the GW-C, to notify the GW-C that the TA in which the UE is located changes. The GW-C determines, according to a new TA in which the UE is located, whether GW-U updating is required, and triggers and completes, if GW-U updating is required, GW-U updating and establishment of a new PDN connection.

Figure 5:
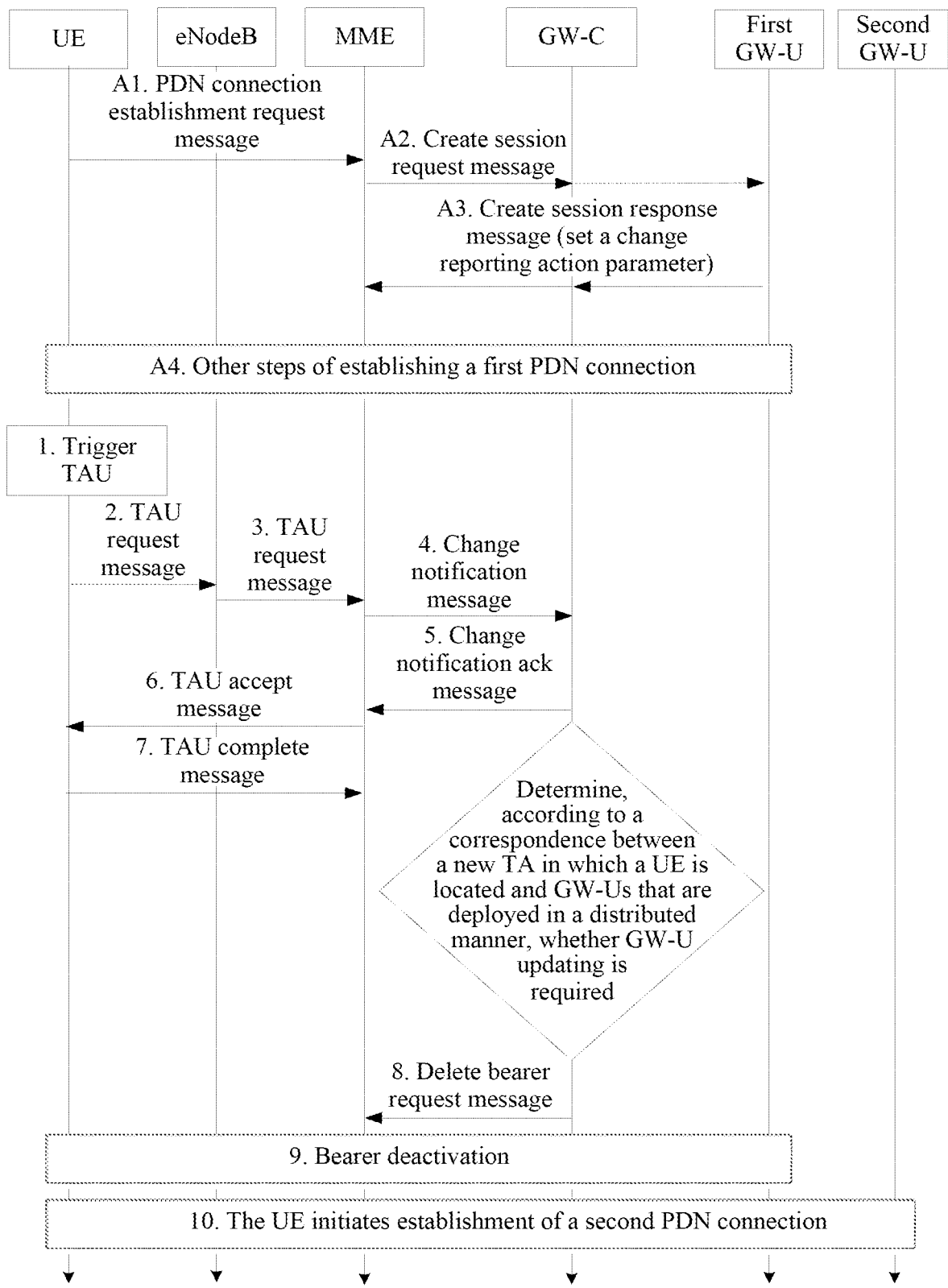
FIG. 5 is a schematic signaling interaction diagram of a first distributed gateway updating method according to an embodiment of the present disclosure.

In order to establish the PDN connection between the UE and the first GW-U, signaling interactions shown in A1 to A4 in FIG. 5 need to be performed between network elements.

A1) The UE sends a PDN connection establishment request (PDN Connectivity Request) message to the MME, to request to establish the first PDN connection.

A2) The MME sends a create session request message to the GW-C, to request to create a session.

A3) The GW-C selects the first GW-U, and sets a change reporting action parameter in a create session response message to be returned to the MME, to request the MME to notify the GW-C when the TA in which the UE is located changes.

A4) The network elements complete other steps of establishing the first PDN connection.

If the UE triggers the execution of the TAU procedure, that is, the TA in which the UE is located changes, in a process of executing the TAU procedure, signaling interactions shown in 1 to 10 in FIG. 5 need to be performed between the network elements.

1) The UE triggers TAU.
2) The UE sends a TAU request message to an eNodeB to initiate TAU.
3) The eNodeB forwards the TAU request message to the MME.
4) The MME sends a change notification message to the GW-C, to notify the GW-C of information that the TA in which the UE is located changes.
5) After receiving the change notification message, the GW-C returns a change notification acknowledgement (Change Notification Ack) message to the MME.
6) The MME sends a TAU accept message to the UE.
7) The UE sends a TAU complete message to the MME.
8) The GW-C determines, according to a correspondence between the new TA in which the UE is located and GW-Us that are deployed in a distributed manner, whether GW-U updating is required; and if GW-U updating is required, the GW-C sends a delete bearer request message to the MME, to indicate the MME to delete a default bearer of the first PDN connection, and sets a cause in the message to "Reactivation Requested".
9) The network elements complete a procedure of deactivating the default bearer of the first PDN connection.
10) According to an indication of the "Reactivation Requested" parameter, the UE initiates a new PDN connection request. The GW-C selects the second GW-U, and completes a process of establishing the PDN connection between the UE and the second GW-U.

In the foregoing process, if a GW-U updating procedure does not need to be executed, steps 8) to 10) are not performed.

In Embodiment 1, the Change Reporting Action is set, so that when the UE performs TAU, the MME proactively notifies the GW-C, and the GW-C determines, according to the new TA in which the UE is located, whether GW-U updating is required, and triggers and completes, if GW-U updating is required, GW-U updating and PDN connection re-establishment.

On the one hand, Embodiment 1 resolves a problem that an existing TAU procedure cannot implement GW-U updating, and the GW-C can select, according to a current location of the UE, a best GW-U and establish a PDN connection, thereby optimizing a data transmission path and ensuring communication performance. On the other hand, in Embodiment 1, an existing Location Change Reporting procedure is used to implement a function of notifying the GW-C by the MME, without changing the MME, so that implementation costs are reduced.

Embodiment 2

Figure 6:
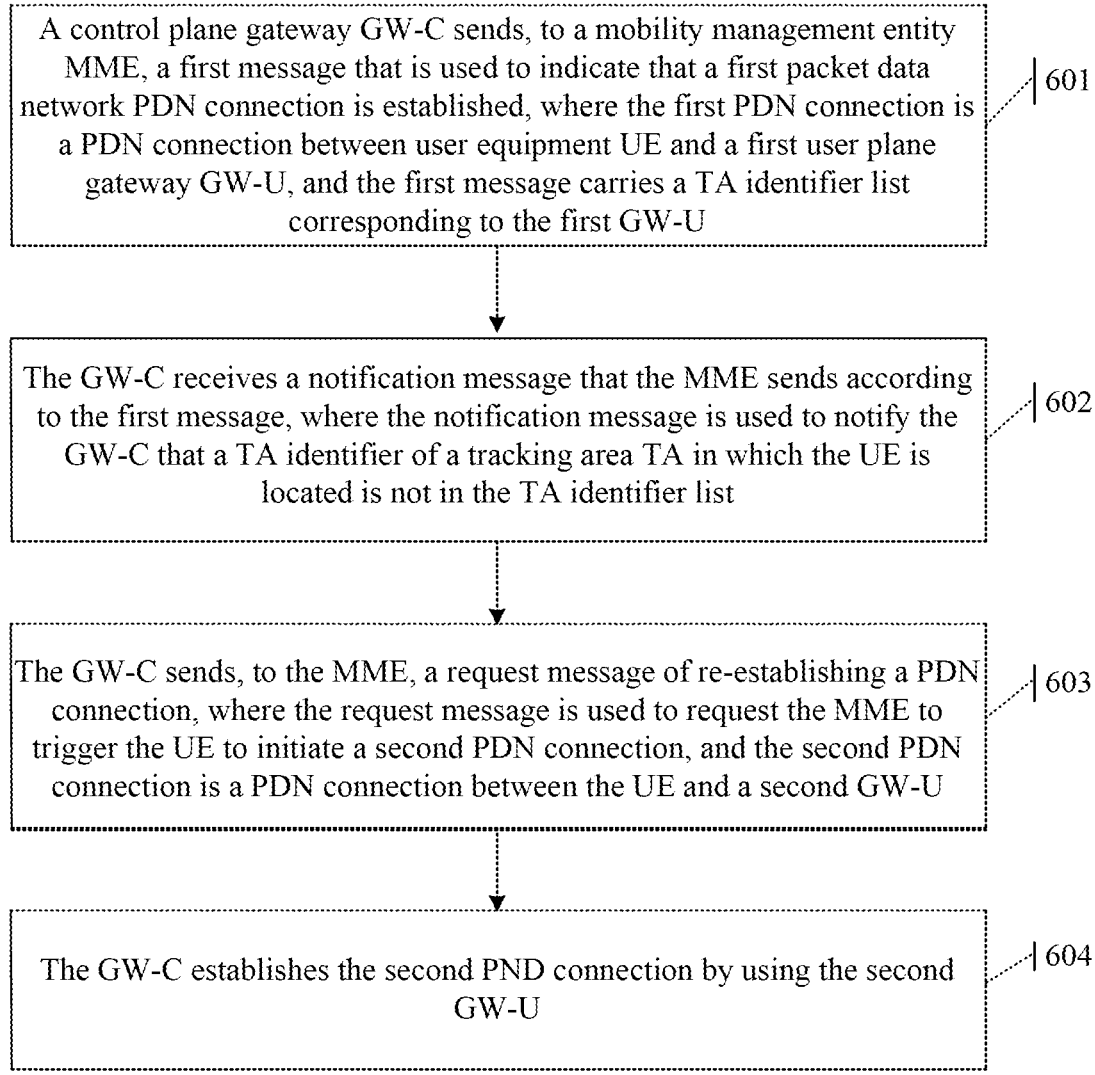
FIG. 6 is a flowchart of a second distributed gateway updating method according to an embodiment of the present disclosure.

Embodiment 2 details how GW-U updating is implemented in a first mechanism. As shown in FIG. 6, in the first mechanism, a second method for implementing GW-U updating includes the following steps.

Step 601: A control plane gateway GW-C sends, to a mobility management entity MME, a first message that is used to indicate that a first PDN connection is established, where the first PDN connection is a PDN connection between a UE and a first user plane gateway GW-U, and the first message carries a TA identifier list corresponding to the first GW-U.

Step 602: The GW-C receives a notification message that the MME sends according to the first message, where the notification message is used to notify the GW-C that a TA identifier of a TA in which the UE is located is not in the TA identifier list.

Step 603: The GW-C sends, to the MME, a request message of re-establishing a PDN connection, where the request message is used to request the MME to trigger the UE to initiate a second PDN connection, and the second PDN connection is a PDN connection between the UE and a second GW-U.

Step 604: The GW-C establishes the second PDN connection by using the second GW-U.

That the GW-C sends, to the MME, a request message of re-establishing a PDN connection includes:

the GW-C sends, to the MME, the request message of re-establishing a PDN connection, where the request message is used to indicate the MME to delete the first PDN connection, and the request message carries a parameter that is used to indicate the UE to establish the second PDN connection.

Specifically, in a process in which the UE attaches to a network or in a process in which the first PDN connection between the UE and the first GW-U is being established, the GW-C sends, to the MME, the TA list corresponding to the first GW-U. If the UE triggers execution of a TAU procedure, the MME determines whether a new TA in which the UE is located is in the TA list corresponding to the first GW-U. If the new TA in which the UE is located is not in the TA list corresponding to the first GW-U, the MME sends a change notification message to the GW-C, and the GW-C triggers a completion of GW-U updating and establishment of a new PDN connection.

Compared with Embodiment 1, in Embodiment 2, it is considered that not every TAU causes GW-U updating, because there may be a case in which both a TA before TAU and a TA after the TAU are corresponding to the first GW-U. Therefore, different from a case, in Embodiment 1, in which the MME sends a change notification message to the GW-C each time when the UE triggers the execution of the TAU procedure, in Embodiment 2, the MME notifies the GW-C only after the UE leaves the TA list corresponding to the first GW-U (that is, only when TAU triggered by the UE causes GW-U updating). Therefore, compared with Embodiment 1, in Embodiment 2, a signaling load is reduced to some extent.

Figure 7A:
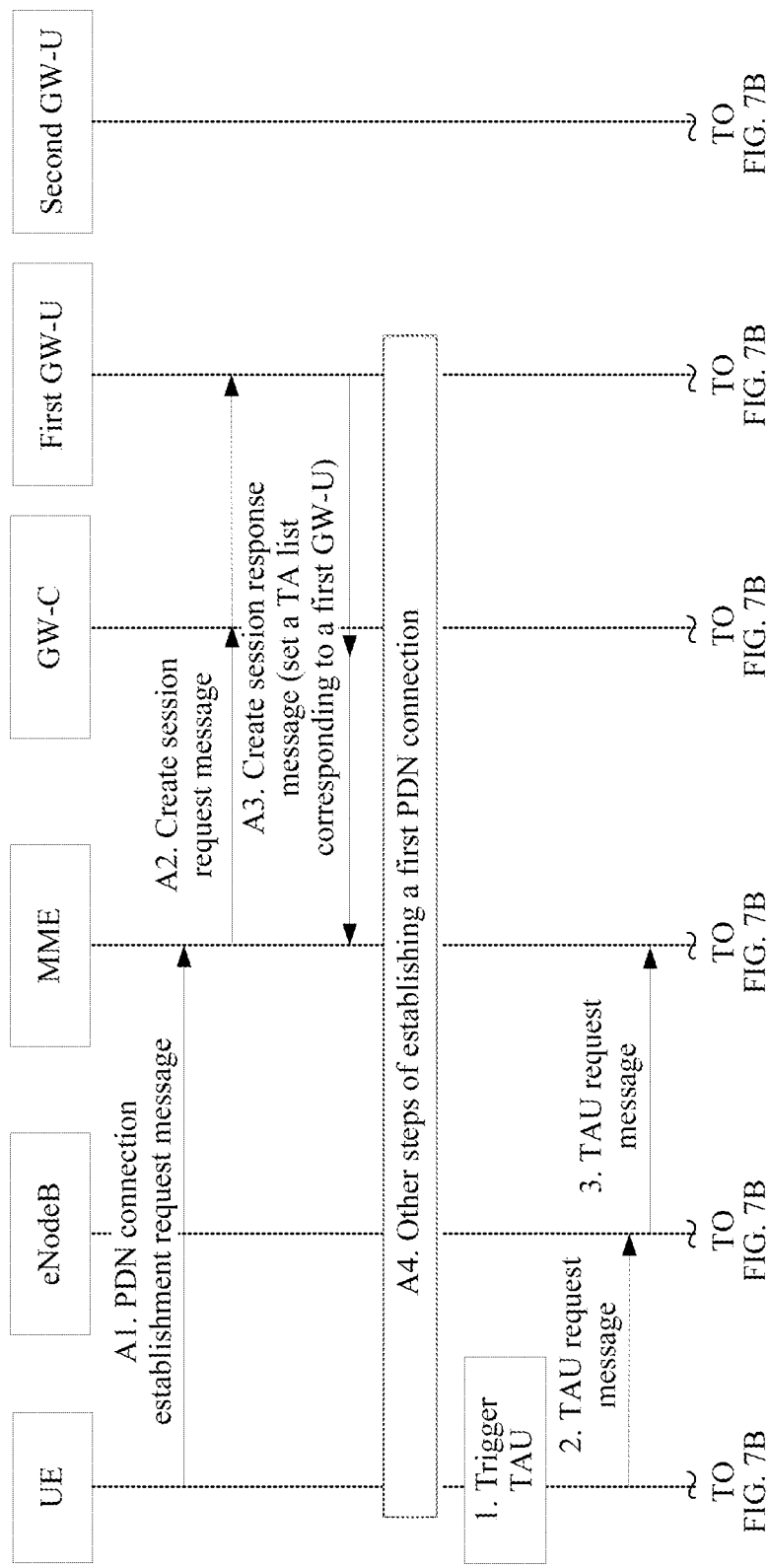
FIG. 7A and FIG. 7B are schematic signaling interaction diagrams of a second distributed gateway updating method according to an embodiment of the present disclosure.

In order to establish the PDN connection between the UE and the first GW-U, signaling interactions shown in A1 to A4 in FIG. 7A need to be performed between network elements.

A1) The UE sends a PDN connection establishment request message to the MME, to request to establish the first PDN connection.

A2) The MME sends a create session request message to the GW-C, to request to create a session.

A3) The GW-C selects the first GW-U, and sets, in a create session response message to be returned to the MME, the TA list corresponding to the first GW-U, and the MME stores the TA list for each UE.

A4) The network elements complete other steps of establishing the first PDN connection.

Figure 7B:
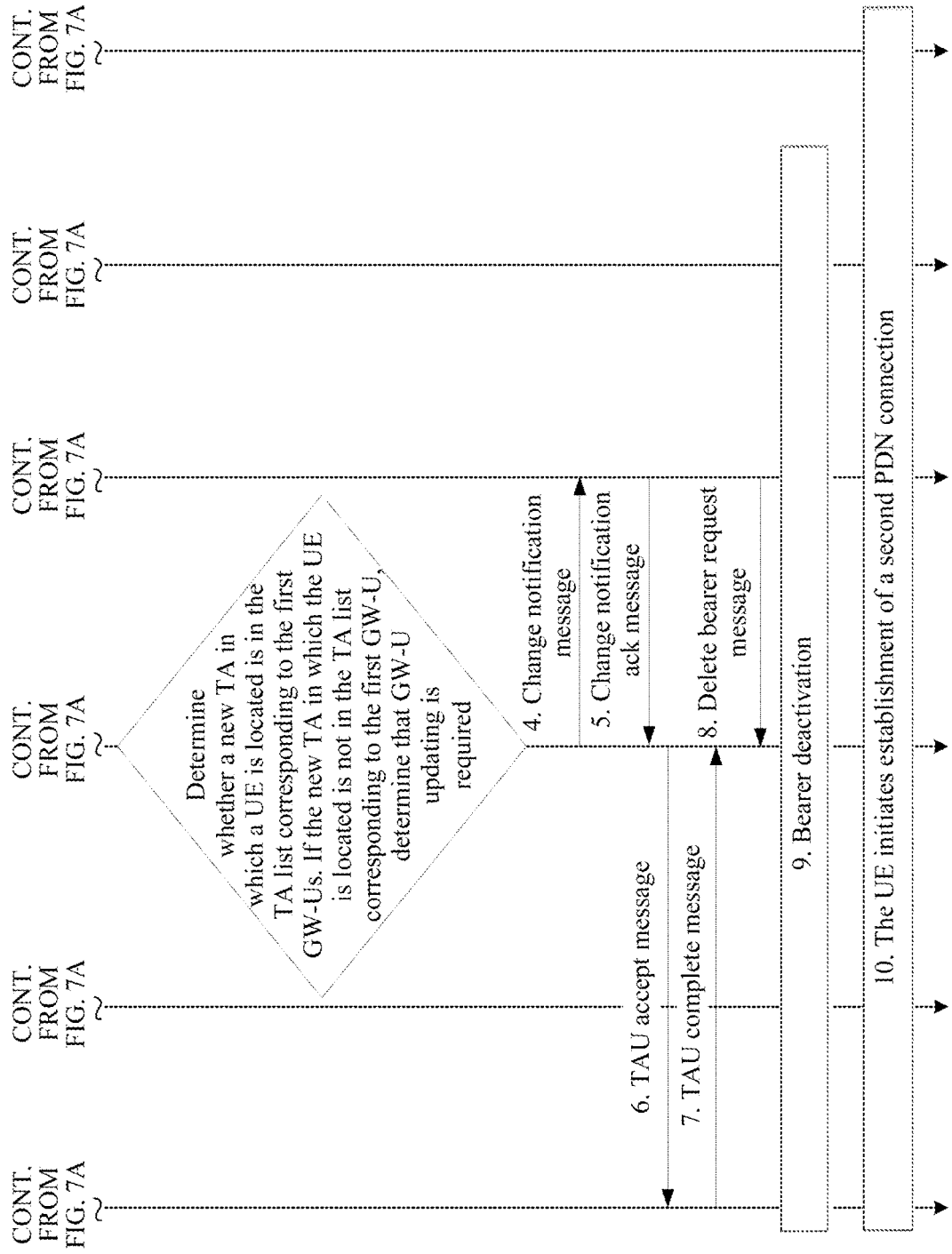

If the UE triggers the execution of the TAU procedure, that is, the TA in which the UE is located changes, in a process of executing the TAU procedure, signaling interactions shown in 1 to 10 in FIG. 7A and FIG. 7B need to be performed between the network elements.

1) The UE triggers TAU.

2) The UE sends a TAU request message to an eNodeB to initiate TAU.

3) The eNodeB forwards the TAU request message to the MME.

4) The MME determines whether the new TA in which the UE is located is in the TA list corresponding to the first GW-U. If the new TA in which the UE is located is not in the TA list corresponding to the first GW-U, the MME sends a change notification message to the GW-C.

5) After receiving the change notification message, the GW-C returns a change notification ack message to the MME.

6) The MME sends a TAU accept message to the UE.

7) The UE sends a TAU complete message to the MME.

8) After receiving the change notification message, the GW-C sends a delete bearer request message to the MME, to indicate the MME to delete a default bearer of the first PDN connection, and sets a cause in the message to "Reactivation Requested".

9) The network elements complete a procedure of deactivating the default bearer of the first PDN connection.

10) According to an indication of the "Reactivation Requested" parameter, the UE initiates a new PDN connection request. The GW-C selects the second GW-U, and completes a process of establishing the PDN connection between the UE and the second GW-U.

In the foregoing process, if a GW-U updating procedure does not need to be executed, steps 4), 5), and 8) to 10) are not performed.

In Embodiment 2, the TA list corresponding to the first GW-U is set, so that when the UE performs TAU, the MME notifies the GW-C only after the UE leaves the TA list corresponding to the first GW-U, and the GW-C triggers and completes GW-U updating and PDN connection re-establishment.

On the one hand, compared with Embodiment 1, in Embodiment 2, a quantity of unnecessary change notification messages is reduced, and the signaling load is reduced. On the other hand, in Embodiment 2, an existing Presence Reporting Area procedure is used to implement a function of notifying, by the MME, the GW-C when the UE leaves a specific TA list, without changing the MME, so that implementation costs are reduced.

Embodiment 3

Figure 8:
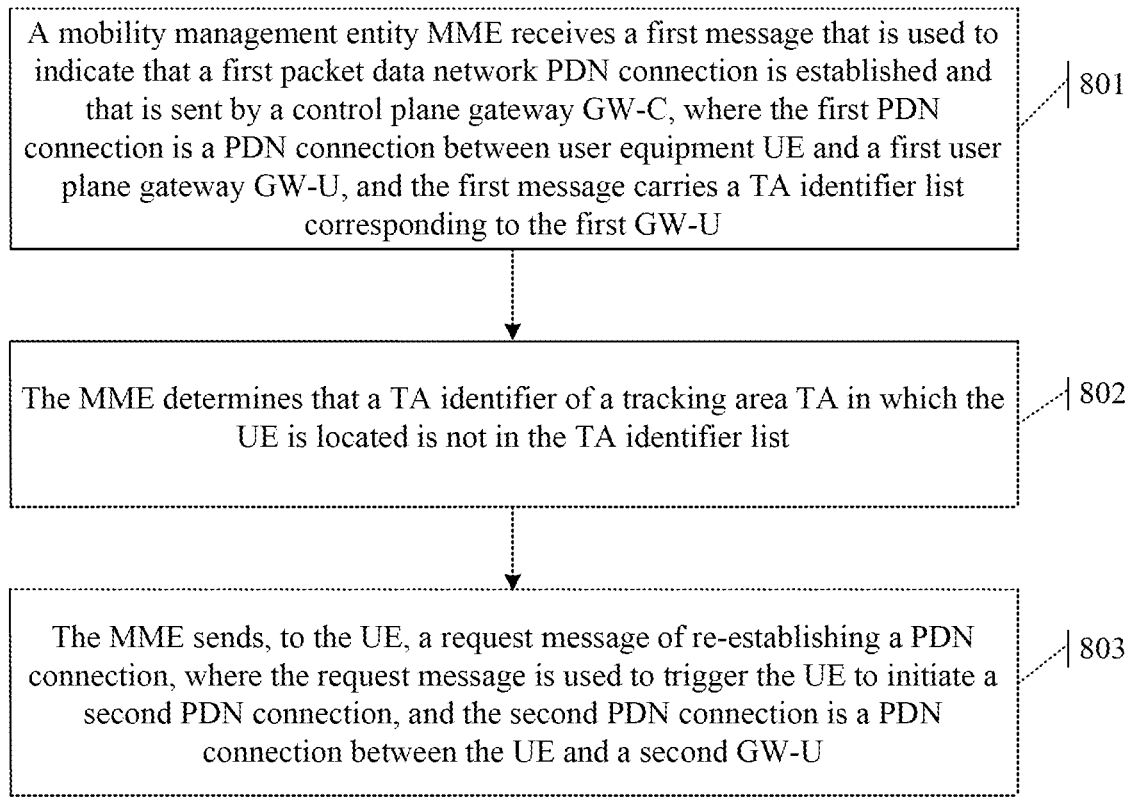
FIG. 8 is a flowchart of a third distributed gateway updating method according to an embodiment of the present disclosure.

Embodiment 3 details how GW-U updating is implemented in a second mechanism. As shown in FIG. 8, in the second mechanism, a first method for implementing GW-U updating includes the following steps.

Step 801: A mobility management entity MME receives a first message that is used to indicate that a first PDN connection is established and that is sent by a control plane gateway GW-C, where the first PDN connection is a PDN connection between a UE and a first user plane gateway GW-U, and the first message carries a TA identifier list corresponding to the first GW-U.

Step 802: The MME determines that a TA identifier of a TA in which the UE is located is not in the TA identifier list.

Step 803: The MME sends, to the UE, a request message of re-establishing a PDN connection, where the request message is used to trigger the UE to initiate a second PDN connection, and the second PDN connection is a PDN connection between the UE and a second GW-U.

That the MME sends, to the UE, a request message of re-establishing a PDN connection includes:

the MME sends a request message of disconnecting the first PDN connection, where the request message carries a parameter that is used to indicate the UE to establish the second PDN connection.

Specifically, in a process in which the UE attaches to a network or in a process in which the first PDN connection between the UE and the first GW-U is being established, the GW-C sends, to the MME, the TA list corresponding to the first GW-U. If the UE triggers execution of a TAU procedure, the MME determines whether a new TA in which the UE is located is in the TA list corresponding to the first GW-U. If the new TA in which the UE is located is not in the TA list corresponding to the first GW-U, the MME triggers and completes GW-U updating and establishment of a new PDN connection.

Compared with Embodiment 2, in Embodiment 3, when the UE leaves the TA list corresponding to the first GW-U (that is, when TAU triggered by the UE causes GW-U updating), the MME no long notifies the GW-C as it does in Embodiment 2. Instead, the MME proactively initiates and completes GW-U updating and PDN connection re-establishment.

Figure 9A:
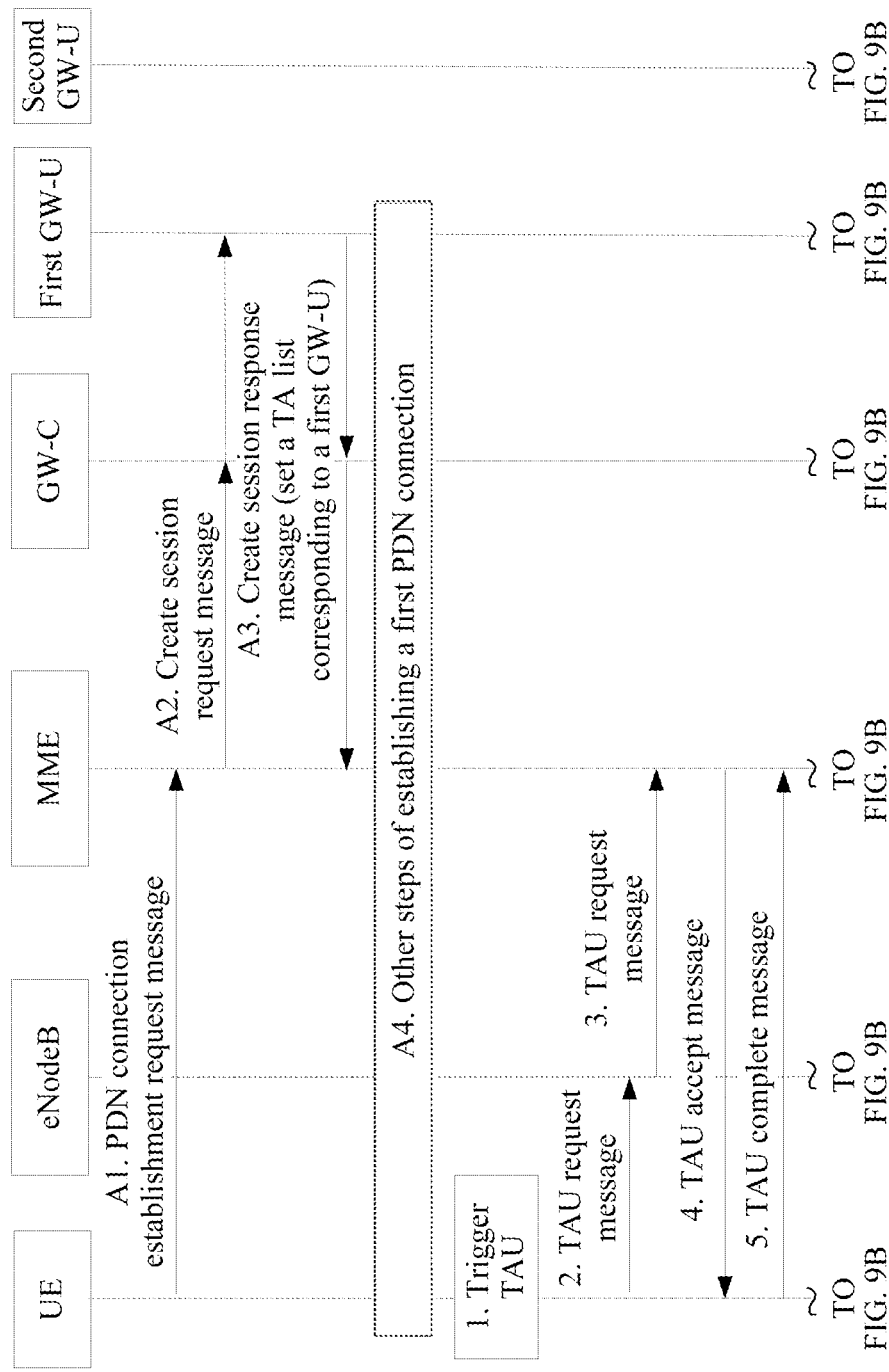
FIG. 9A and FIG. 9B are schematic signaling interaction diagrams of a third distributed gateway updating method according to an embodiment of the present disclosure.

In order to establish the PDN connection between the UE and the first GW-U, signaling interactions shown in A1 to A4 in FIG. 9A need to be performed between network elements.

A1) The UE sends a PDN connection establishment request message to the MME, to request to establish the first PDN connection.

A2) The MME sends a create session request message to the GW-C, to request to create a session.

A3) The GW-C selects the first GW-U, and sets, in a create session response message to be returned to the MME, the TA list corresponding to the first GW-U, and the MME stores the TA list for each UE.

A4) The network elements complete other steps of establishing the first PDN connection.

Figure 9B:
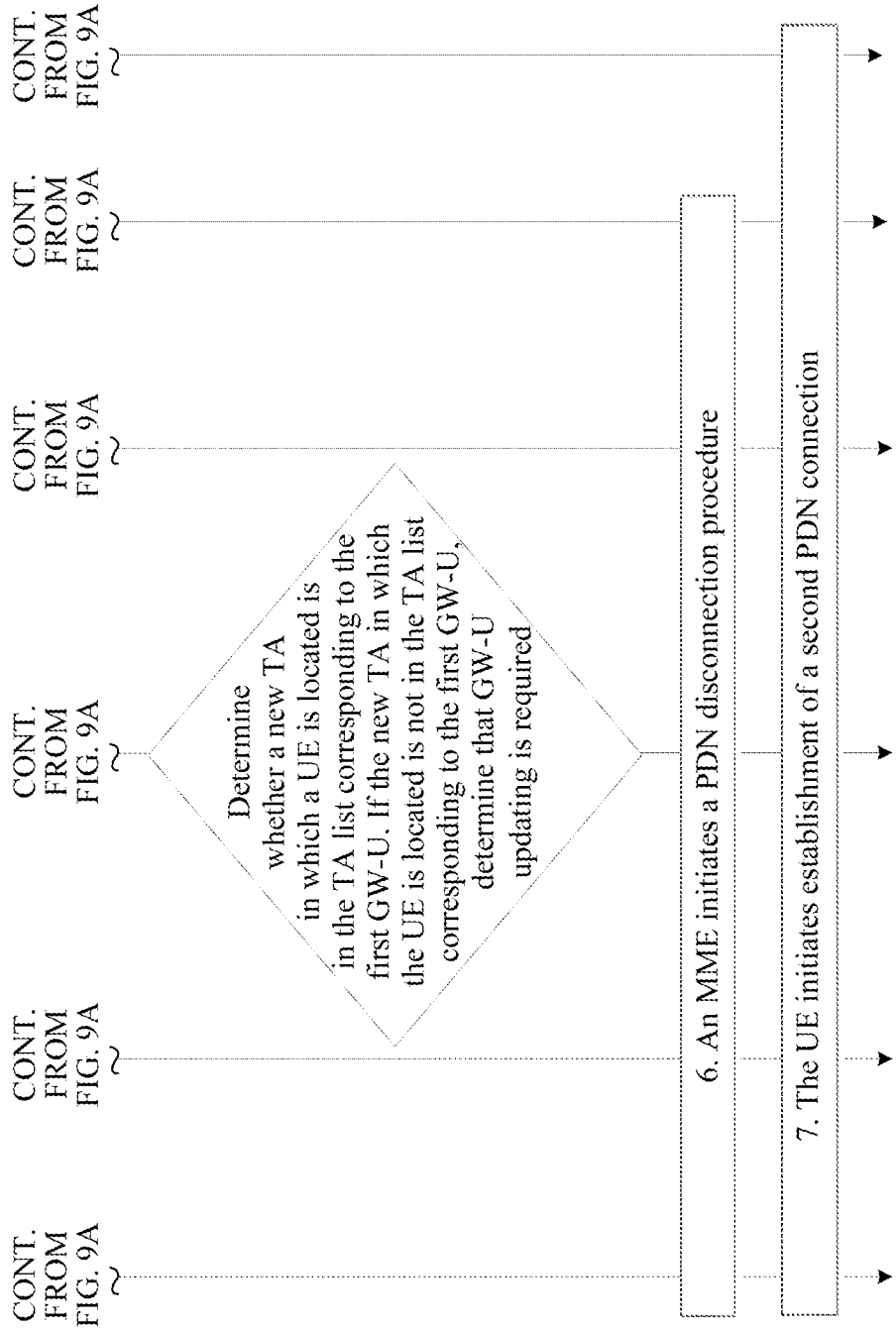

If the UE triggers the execution of the TAU procedure, that is, the TA in which the UE is located changes, in a process of executing the TAU procedure, signaling interactions shown in 1 to 7 in FIG. 9A and FIG. 9B need to be performed between the network elements.

1) The UE triggers TAU.

2) The UE sends a TAU request message to an eNodeB to initiate TAU.

3) The eNodeB forwards the TAU request message to the MME.

4) The MME sends a TAU accept message to the UE.

5) The UE sends a TAU complete message to the MME.

6) The MME determines whether the new TA in which the UE is located is in the TA list corresponding to the first GW-U. If the new TA in which the UE is located is not in the TA list corresponding to the first GW-U, the MME initiates a PDN disconnection procedure, and sets a cause in a message to "Reactivation Requested".

7) According to an indication of the "Reactivation Requested" parameter, the UE initiates a new PDN connection request. The GW-C selects the second GW-U, and completes a process of establishing the PDN connection between the UE and the second GW-U.

In the foregoing process, if a GW-U updating procedure does not need to be executed, steps 6) and 7) are not performed.

In Embodiment 3, the TA list corresponding to the first GW-U is set, so that when the UE performs TAU, the MME proactively initiates and completes GW-U updating and PDN connection re-establishment only after the UE leaves the TA list corresponding to the first GW-U.

In Embodiment 3, a function expansion needs to be performed on the MME, so that the MME can determine whether TAU causes GW-U updating, and initiate and complete GW-U updating and PDN connection re-establishment. Compared with Embodiment 2, in Embodiment 3, a quantity of signaling interactions between the MME and a GW-U (change notification and change notification ack messages in Embodiment 2) is reduced, and a signaling load is further reduced.

Embodiment 4

Figure 10:
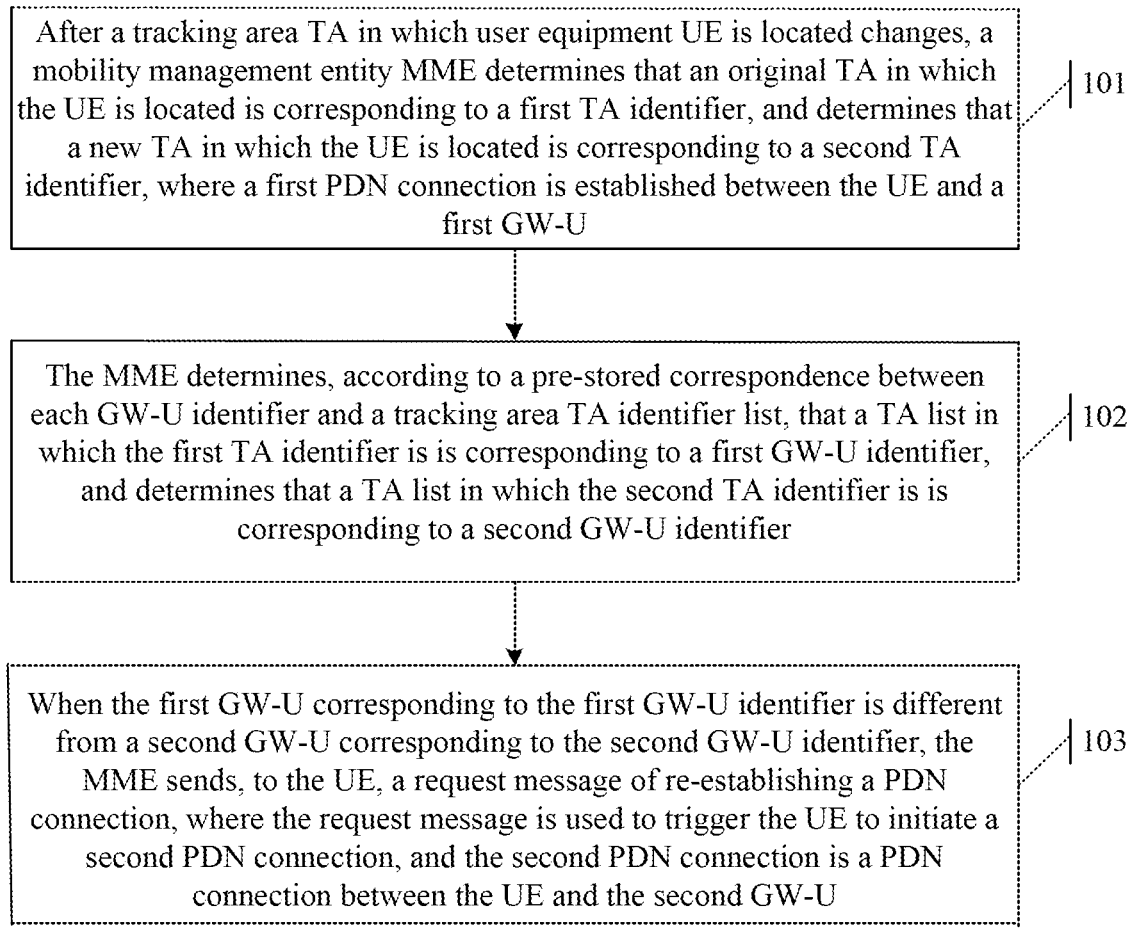
FIG. 10 is a flowchart of a fourth distributed gateway updating method according to an embodiment of the present disclosure.

Embodiment 4 details how GW-U updating is implemented in a second mechanism. As shown in FIG. 10, in the second mechanism, a second method for implementing GW-U updating includes the following steps.

Step 101: After a tracking area TA in which a UE is located changes, a mobility management entity MME determines that an original TA in which the UE is located is corresponding to a first TA identifier, and determines that a new TA in which the UE is located is corresponding to a second TA identifier, where a first PDN connection is established between the UE and a first GW-U.

Step 102: The MME determines, according to a pre-stored correspondence between each GW-U identifier and a TA identifier list, that a TA list in which the first TA identifier is corresponding to a first GW-U identifier, and determines that a TA list in which the second TA identifier is corresponding to a second GW-U identifier.

Step 103: When the first GW-U corresponding to the first GW-U identifier is different from a second GW-U corresponding to the second GW-U identifier, the MME sends, to the UE, a request message of re-establishing a PDN connection, where the request message is used to trigger the UE to initiate a second PDN connection, and the second PDN connection is a PDN connection between the UE and the second GW-U.

That the MME sends, to the UE, a request message of re-establishing a PDN connection includes:

the MME sends, to the UE, a request message of disconnecting the first PDN connection, where the request message carries a parameter that is used to indicate the UE to establish the second PDN connection.

Specifically, a TA list corresponding to each GW-U is sent to the MME by using device-level signaling. If the UE triggers execution of a TAU procedure, the MME determines whether a GW-U corresponding to the new TA in which the UE is located is the same as a GW-U corresponding to the original TA in which the UE is located. If the GW-U corresponding to the new TA in which the UE is located is different from the GW-U corresponding to the original TA in which the UE is located, the MME triggers and completes GW-U updating and establishment of a new PDN connection.

Figure 11A:
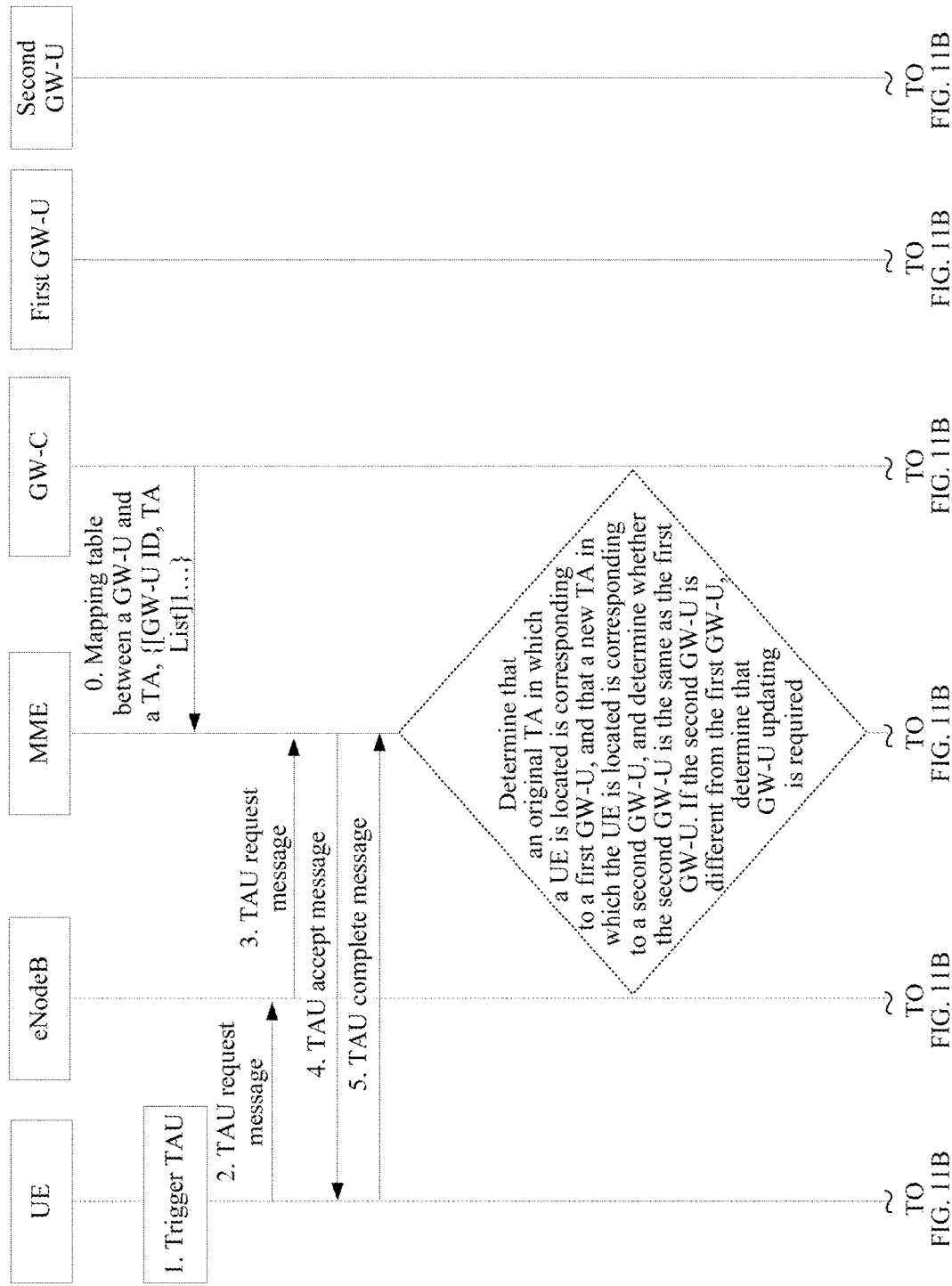
FIG. 11A and FIG. 11B are schematic signaling interaction diagrams of a fourth distributed gateway updating method according to an embodiment of the present disclosure.
Figure 11B:
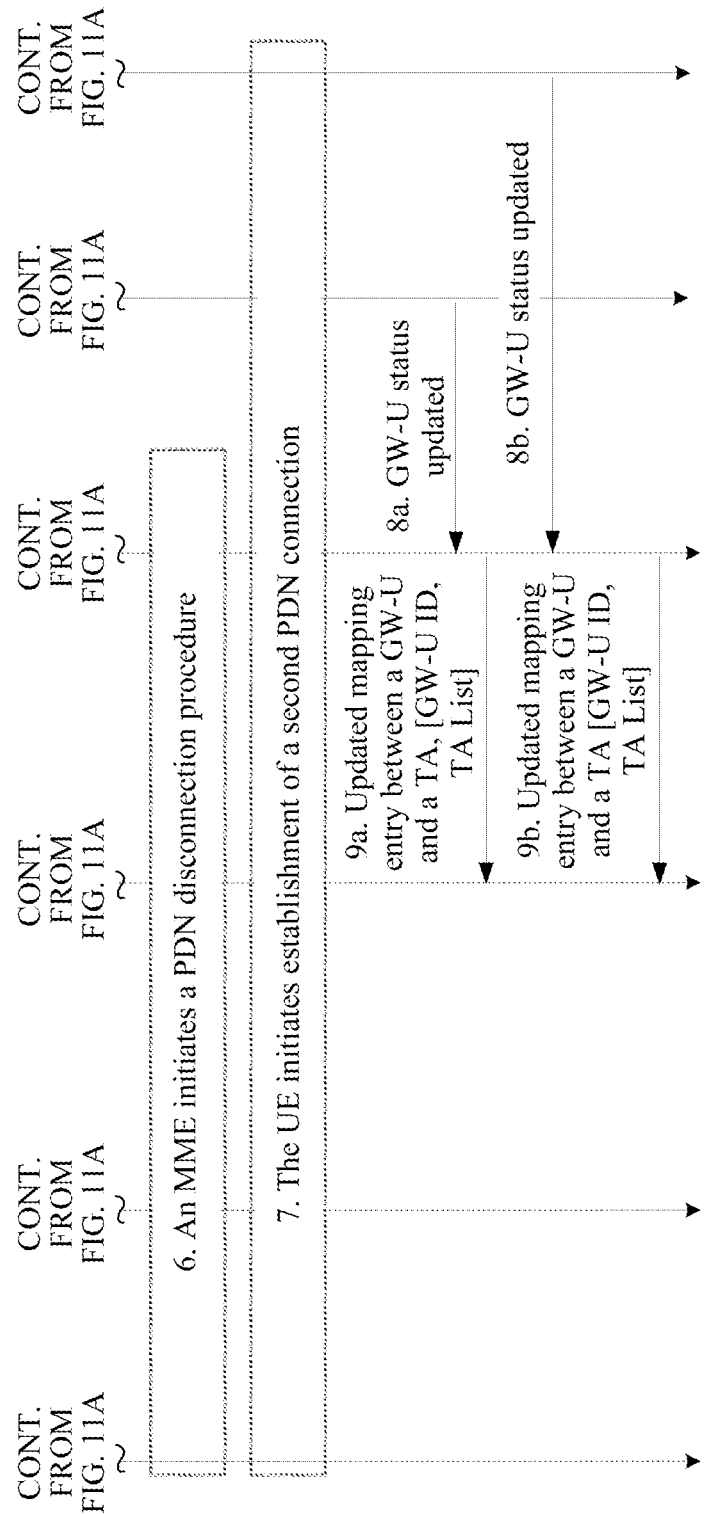

If the UE triggers the execution of the TAU procedure, that is, the TA in which the UE is located changes, in a process of executing the TAU procedure, signaling interactions shown in 0 to 7 in FIG. 11A and FIG. 11B need to be performed between network elements.

0) The GW-C sends a mapping table between a GW-U and a TA, {[GW-U ID, TA list], . . . }, to the MME, or configures in advance, in the MME, the mapping table between a GW-U and a TA, {[GW-U ID, TA list], . . . }. Later, during UE attach or establishment of the first PDN connection, the MME may obtain, according to the TA in which the UE is located and by means of calculation, that a corresponding GW-U ID is the first GW-U.

1) The UE triggers TAU.

2) The UE sends a TAU request message to an eNodeB to initiate TAU.

3) The eNodeB forwards the TAU request message to the MME.

4) The MME sends a TAU accept message to the UE.

5) The UE sends a TAU complete message to the MME.

6) The MME searches the mapping table between a GW-U and a TA, determines that the new TA in which the UE is located is corresponding to the second GW-U, and determines whether the second GW-U is the same as the first GW-U. If the second GW-U is different from the first GW-U, the MME initiates a PDN disconnection procedure, and sets a cause in a message to "Reactivation Requested".

7) According to an indication of the "Reactivation Requested" parameter, the UE initiates a new PDN connection request. The GW-C selects a new GW-U, and completes a process of establishing a PDN connection between the UE and the newly selected GW-U.

In the foregoing process, if a GW-U updating procedure does not need to be executed, steps 6) and 7) are not performed.

In Embodiment 4, because a GW-U status may change (addition, deletion, a location change, a change of a corresponding TA list, and the like), after step 0) is performed, signaling interactions shown in 8) and 9) in FIG. 11B need to be performed between the network elements.

8) When a GW-U status changes (e.g., addition, deletion, a location change, a change of a corresponding TA list, and the like), a GW-U whose status changes notifies the GW-C.

9) The GW-C sends, according to GW-U status change information, the updated mapping table between a GW-U and a TA to the MME.

In the foregoing process, step 8) is performed only when the GW-U status changes, and step 9) is performed only when a mapping relationship between a GW-U and a TA list changes.

In Embodiment 4, the GW-C transfers the mapping table between a GW-U and a TA to the MME by using the device-level signaling, so that when the UE performs TAU, the MME can search the mapping table, to determine whether GW-U updating is required, and when determining that GW-U updating is required, the MME proactively initiates and completes GW-U updating and PDN connection re-establishment. In addition, when the GW-U status changes, the GW-C updates the mapping table between a GW-U and a TA by using a device-level message.

In embodiment 4, a function expansion needs to be performed on the MME, so that the MME can receive and process the mapping table between a GW-U and a TA, determine whether TAU causes GW-U updating, and initiate and complete GW-U updating and PDN connection re-establishment. Compared with Embodiment 1 to Embodiment 3, in Embodiment 4, on the one hand, the device-level signaling is used to transfer the mapping table between a GW-U and a TA, and a signaling load of a system is further reduced; on the other hand, when the GW-U status changes, a new mapping relationship can be sent to the MME in a timely manner, thereby ensuring that the MME can correctly determine whether GW-U updating is required.

Compared with Embodiment 1 and Embodiment 2, in Embodiment 3 and Embodiment 4, proactively initiating, by the MME, a PDN re-establishment procedure is actually using the PDN disconnection procedure to trigger the UE to initiate PDN connection re-establishment, whereas in Embodiment 1 and Embodiment 2, initiating, by the GW-C, the PDN re-establishment procedure is actually using the procedure of deactivating the default bearer of the first PDN connection to trigger the UE to initiate PDN connection re-establishment.

Compared with Embodiment 2 and Embodiment 3, in Embodiment 4, the GW-C sends the mapping table between a GW-U and a TA to the MME, or configures in advance, in the MME, the mapping table between a GW-U and a TA. Therefore, in a process in which the UE establishes the PDN connection with the first GW-U, the TA list corresponding to the first GW-U is not transferred again.

In conclusion, to resolve a prior-art technical problem that GW-U updating is not supported in the process of executing the TAU procedure, the embodiments of the present disclosure provide four different solutions. For purposes of being compatible with an existing implementation mechanism and improving system efficiency, when the UE performs TAU, an EPS system of a distributed gateway can select, according to a current location of the UE, a best GW-U and re-establish a PDN connection, thereby optimizing a data transmission path and ensuring communication performance.

Based on a same inventive concept, an embodiment of the present disclosure further provides a user plane gateway updating apparatus.

Figure 12:
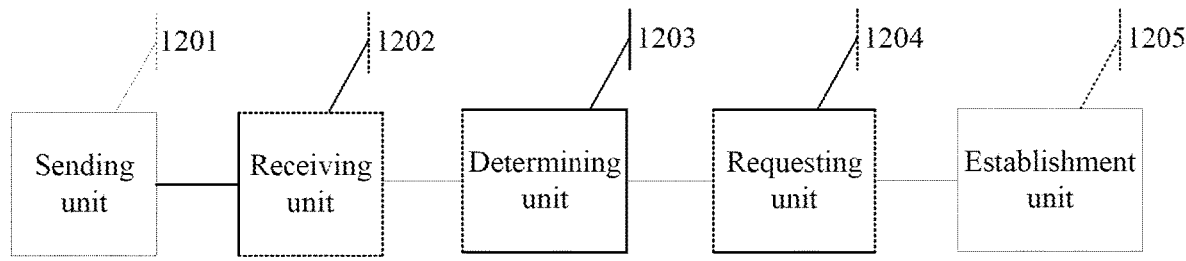
FIG. 12 is a first schematic module diagram of a user plane gateway updating apparatus according to an embodiment of the present disclosure.

Referring to FIG. 12, FIG. 12 is a first schematic module diagram of a user plane gateway updating apparatus according to an embodiment of the present disclosure. For a meaning of a term used in and specific implementation of the user plane gateway updating apparatus shown in FIG. 12, reference may be made to a related description of FIG. 1 to FIG. 11B and the foregoing embodiments. The apparatus may be the control plane gateway described above, and the apparatus includes a sending unit 1201, a receiving unit 1202, a determining unit 1203, a requesting unit 1204, and an establishment unit 1205.

The sending unit 1201 is configured to send, to a mobility management entity MME, a first message that is used to indicate that a first PDN connection is established, where the first PDN connection is a PDN connection between a UE and a first user plane gateway GW-U, the first message carries a notification parameter, and the notification parameter is used to request the MME to notify a GW-C when a tracking area TA in which the UE is located changes.

The receiving unit 1202 is configured to receive a notification message sent by the MME, where the notification message is used to notify the GW-C that the TA in which the UE is located changes.

The determining unit 1203 is configured to determine, according to the notification message, that a new TA in which the UE is located is corresponding to a second GW-U, where the second GW-U is different from the first GW-U.

The requesting unit 1204 is configured to send, to the MME, a request message of re-establishing a PDN connection, where the request message is used to request the MME to trigger the UE to initiate a second PDN connection, and the second PDN connection is a PDN connection between the UE and the second GW-U.

The establishment unit 1205 is configured to establish the second PDN connection by using the second GW-U.

Optionally, the requesting unit 1204 is configured to: send, to the MME, the request message of re-establishing a PDN connection, where the request message is used to indicate the MME to delete the first PDN connection, and the request message carries a parameter that is used to indicate the UE to establish the second PDN connection.

Various variation manners and specific examples in the foregoing user plane gateway updating method in the embodiments of FIG. 4 and FIG. 5 are also applicable to the user plane gateway updating apparatus in this embodiment. According to the foregoing detailed description of the user plane gateway updating method, a person skilled in the art can clearly know an implementation method of the user plane gateway updating apparatus in this embodiment. Therefore, for brevity of the specification, details are not described herein.

Figure 13:
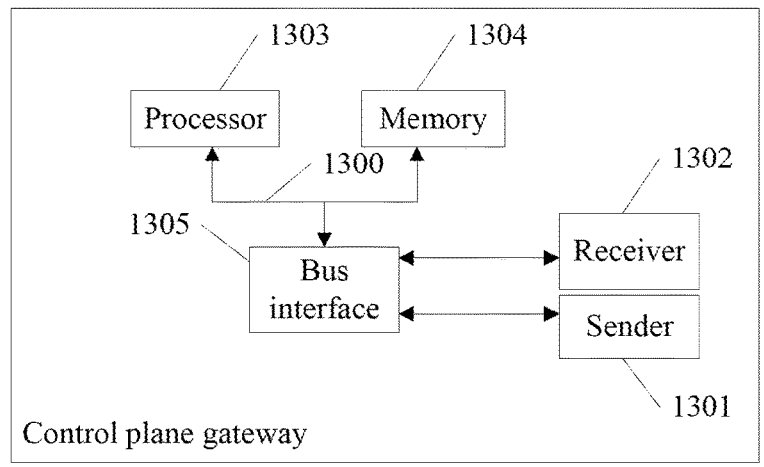
FIG. 13 is a first schematic structural diagram of a control plane gateway according to an embodiment of the present disclosure.

Referring to FIG. 13, FIG. 13 is a first schematic structural diagram of a control plane gateway according to an embodiment of the present disclosure. For a meaning of a term used in and specific implementation of the user plane gateway shown in FIG. 13, reference may be made to a related description of FIG. 1 to FIG. 11B and the foregoing embodiments. The control plane gateway may be the control plane gateway described above, and the control plane gateway includes a sender 1301, a receiver 1302, a processor 1303, and a memory 1304.

The sender 1301 is configured to send, to a mobility management entity MME, a first message that is used to indicate that a first PDN connection is established, where the first PDN connection is a PDN connection between a UE and a first user plane gateway GW-U, the first message carries a notification parameter, and the notification parameter is used to request the MME to notify a GW-C when a tracking area TA in which the UE is located changes.

The receiver 1302 is configured to receive a notification message sent by the MME, where the notification message is used to notify the GW-C that the TA in which the UE is located changes.

The processor 1303 is configured to determine, according to the notification message, that a new TA in which the UE is located is corresponding to a second GW-U, where the second GW-U is different from the first GW-U; configured to send, to the MME, a request message of re-establishing a PDN connection, where the request message is used to request the MME to trigger the UE to initiate a second PDN connection, and the second PDN connection is a PDN connection between the UE and the second GW-U; and configured to establish the second PDN connection by using the second GW-U.

Optionally, the processor 1303 is further configured to send, to the MME, the request message of re-establishing a PDN connection, where the request message is used to indicate the MME to delete the first PDN connection, and the request message carries a parameter that is used to indicate the UE to establish the second PDN connection.

In FIG. 13, a bus architecture (represented by using a bus 1300) may include any quantity of interconnected buses and bridges, and the bus 1300 connects together a circuit of one or more processors represented by the processor 1303 and a circuit of a memory represented by the memory 1304. The bus 1300 may further connect, for example, a peripheral device or a voltage stabilizer to various other circuits such as a power management circuit. These are well known in the art, and therefore are not further described in this specification any more. A bus interface 1305 provides an interface between the bus 1300 and the receiver 1302 and an interface between the bus 1300 and the sender 1301. The receiver 1302 and the sender 1301 may be one component, that is, a transceiver that provides a unit configured to communicate with various other apparatuses on a transmission medium.

The processor 1303 is responsible for managing the bus 1300 and general processing. The memory 1304 may be configured to store data that is used when the processor 1303 performs an operation.

Various variation manners and specific examples in the foregoing user plane gateway updating method in the embodiments of FIG. 4 and FIG. 5 are also applicable to the control plane gateway in this embodiment. According to the foregoing detailed description of the user plane gateway updating method, a person skilled in the art can clearly know an implementation method of the control plane gateway in this embodiment. Therefore, for brevity of the specification, details are not described herein.

Figure 14:
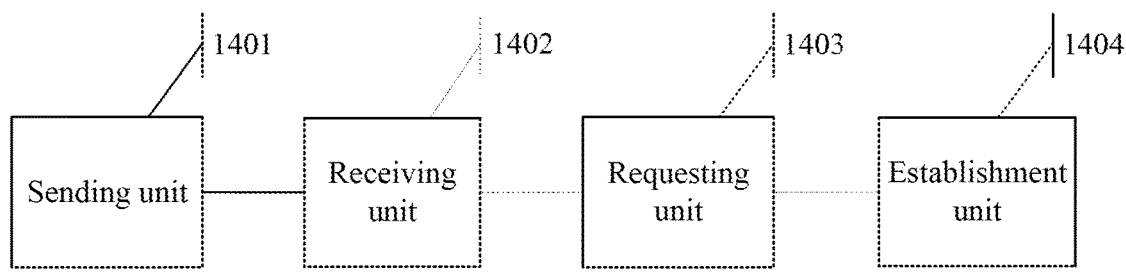
FIG. 14 is a second schematic module diagram of a user plane gateway updating apparatus according to an embodiment of the present disclosure.

Referring to FIG. 14, FIG. 14 is a second schematic module diagram of a user plane gateway updating apparatus according to an embodiment of the present disclosure. For a meaning of a term used in and specific implementation of the user plane gateway updating apparatus shown in FIG. 14, reference may be made to a related description of FIG. 1 to FIG. 11B and the foregoing embodiments. The apparatus may be the control plane gateway described above, and the apparatus includes a sending unit 1401, a receiving unit 1402, a requesting unit 1403, and an establishment unit 1404.

The sending unit 1401 is configured to send, to a mobility management entity MME, a first message that is used to indicate that a first PDN connection is established, where the first PDN connection is a PDN connection between a UE and a first user plane gateway GW-U, and the first message carries a TA identifier list corresponding to the first GW-U.

The receiving unit 1402 is configured to receive a notification message that the MME sends according to the first message, where the notification message is used to notify a GW-C that a TA identifier of a TA in which the UE is located is not in the TA identifier list.

The requesting unit 1403 is configured to send, to the MME, a request message of re-establishing a PDN connection, where the request message is used to request the MME to trigger the UE to initiate a second PDN connection, and the second PDN connection is a PDN connection between the UE and a second GW-U.

The establishment unit 1404 is configured to establish the second PDN connection by using the second GW-U.

Optionally, the requesting unit 1403 is configured to:
send, to the MME, the request message of re-establishing a PDN connection, where the request message is used to indicate the MME to delete the first PDN connection, and the request message carries a parameter that is used to indicate the UE to establish the second PDN connection.

Various variation manners and specific examples in the foregoing user plane gateway updating method in the embodiments of FIG. 6, FIG. 7A, and FIG. 7B are also applicable to the user plane gateway updating apparatus in this embodiment. According to the foregoing detailed description of the user plane gateway updating method, a person skilled in the art can clearly know an implementation method of the user plane gateway updating apparatus in this embodiment. Therefore, for brevity of the specification, details are not described herein.

Figure 15:
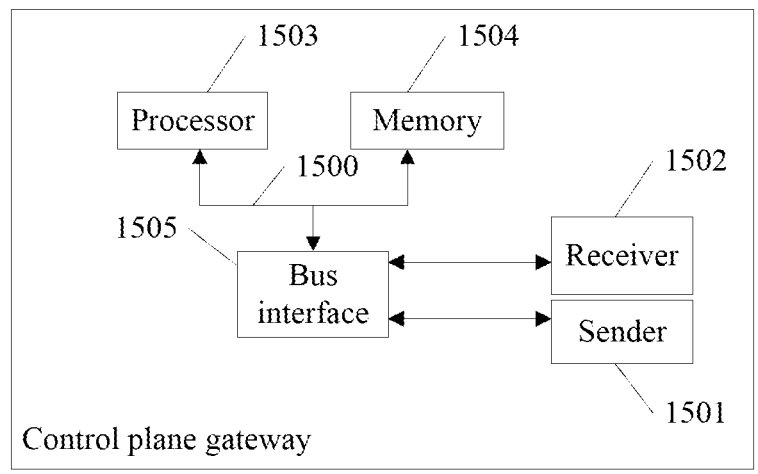
FIG. 15 is a second schematic structural diagram of a control plane gateway according to an embodiment of the present disclosure.

Referring to FIG. 15, FIG. 15 is a second schematic structural diagram of a control plane gateway according to an embodiment of the present disclosure. For a meaning of a term used in and specific implementation of the user plane gateway shown in FIG. 15, reference may be made to a related description of the foregoing FIG. 1 to FIG. 11B and the embodiments. The control plane gateway may be the control plane gateway described above, and the control plane gateway includes a sender 1501, a receiver 1502, a processor 1503, and a memory 1504.

The sender 1501 is configured to send, to a mobility management entity MME, a first message that is used to indicate that a first PDN connection is established, where the first PDN connection is a PDN connection between a UE and a first user plane gateway GW-U, and the first message carries a TA identifier list corresponding to the first GW-U.

The receiver 1502 is configured to receive a notification message that the MME sends according to the first message, where the notification message is used to notify a GW-C that a TA identifier of a TA in which the UE is located is not in the TA identifier list.

The processor 1503 is configured to send, to the MME, a request message of re-establishing a PDN connection, where the request message is used to request the MME to trigger the UE to initiate a second PDN connection, and the second PDN connection is a PDN connection between the UE and a second GW-U; and configured to establish the second PDN connection by using the second GW-U.

Optionally, the processor 1503 is further configured to send, to the MME, the request message of re-establishing a PDN connection, where the request message is used to indicate the MME to delete the first PDN connection, and the request message carries a parameter that is used to indicate the UE to establish the second PDN connection.

In FIG. 15, a bus architecture (represented by using a bus 1500) may include any quantity of interconnected buses and bridges, and the bus 1500 connects together a circuit of one or more processors represented by the processor 1503 and a circuit of a memory represented by the memory 1504. The bus 1500 may further connect, for example, a peripheral device or a voltage stabilizer to various other circuits such as a power management circuit. These are well known in the art, and therefore are not further described in this specification any more. A bus interface 1505 provides an interface between the bus 1500 and the receiver 1502 and an interface between the bus 1500 and the sender 1501. The receiver 1502 and the sender 1501 may be one component, that is, a transceiver that provides a unit configured to communicate with various other apparatuses on a transmission medium.

The processor 1503 is responsible for managing the bus 1500 and general processing. The memory 1504 may be configured to store data that is used when the processor 1503 performs an operation.

Various variation manners and specific examples in the foregoing user plane gateway updating method in the embodiments of FIG. 6, FIG. 7A, and FIG. 7B are also applicable to the control plane gateway in this embodiment. According to the foregoing detailed description of the user plane gateway updating method, a person skilled in the art can clearly know an implementation method of the control plane gateway in this embodiment. Therefore, for brevity of the specification, details are not described herein.

Figure 16:
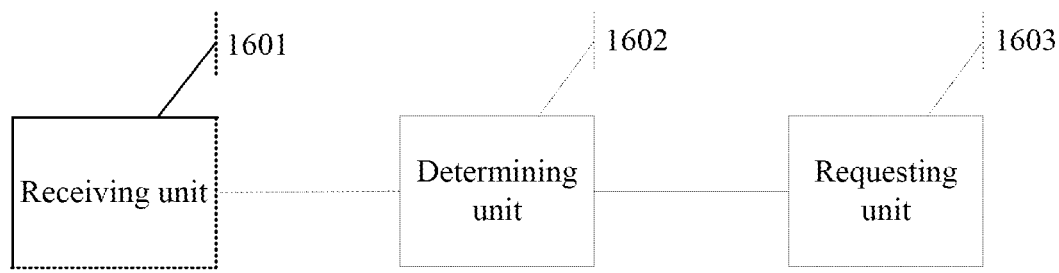
FIG. 16 is a third schematic module diagram of a user plane gateway updating apparatus according to an embodiment of the present disclosure.

Referring to FIG. 16, FIG. 16 is a third schematic module diagram of a user plane gateway updating apparatus according to an embodiment of the present disclosure. For a meaning of a term used in and specific implementation of the user plane gateway updating apparatus shown in FIG. 16, reference may be made to a related description of FIG. 1 to FIG. 11B and the foregoing embodiments. The apparatus may be the mobility management entity described above, and the apparatus includes a receiving unit 1601, a determining unit 1602, and a requesting unit 1603.

The receiving unit 1601 is configured to receive a first message that is used to indicate that a first PDN connection is established and that is sent by a control plane gateway GW-C, where the first PDN connection is a PDN connection between a UE and a first user plane gateway GW-U, and the first message carries a TA identifier list corresponding to the first GW-U.

The determining unit 1602 is configured to determine that a TA identifier of a TA in which the UE is located is not in the TA identifier list.

The requesting unit 1603 is configured to send, to the UE, a request message of re-establishing a PDN connection, where the request message is used to trigger the UE to initiate a second PDN connection, and the second PDN connection is a PDN connection between the UE and a second GW-U.

Optionally, the requesting unit 1603 is configured to:

send a request message of disconnecting the first PDN connection, where the request message carries a parameter that is used to indicate the UE to establish the second PDN connection.

Various variation manners and specific examples in the foregoing user plane gateway updating method in the embodiments of FIG. 8, FIG. 9A, and FIG. 9B are also applicable to the user plane gateway updating apparatus in this embodiment. According to the foregoing detailed description of the user plane gateway updating method, a person skilled in the art can clearly know an implementation method of the user plane gateway updating apparatus in this embodiment. Therefore, for brevity of the specification, details are not described herein.

Figure 17:
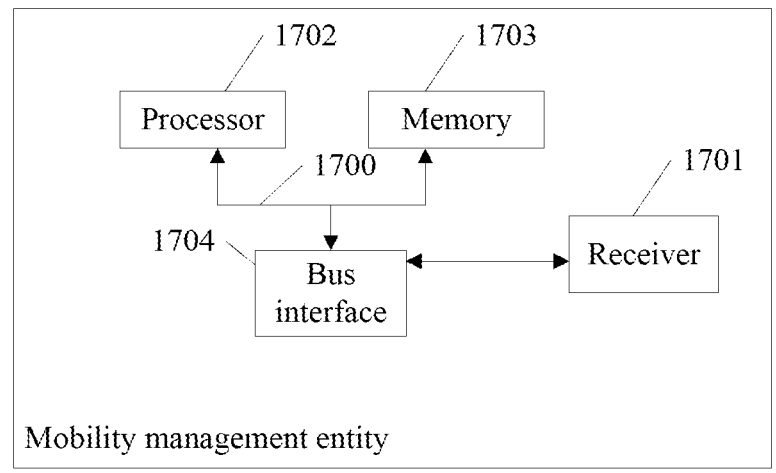
FIG. 17 is a first schematic structural diagram of a mobility management entity according to an embodiment of the present disclosure.

Referring to FIG. 17, FIG. 17 is a first schematic structural diagram of a mobility management entity according to an embodiment of the present disclosure. For a meaning of a term used in and specific implementation of the mobility management entity shown in FIG. 17, reference may be made to a related description of FIG. 1 to FIG. 11B and the foregoing embodiments. The mobility management entity may be the mobility management entity described above, and the mobility management entity includes a receiver 1701, a processor 1702, and a memory 1703.

The receiver 1701 is configured to receive a first message that is used to indicate that a first PDN connection is established and that is sent by a control plane gateway GW-C, where the first PDN connection is a PDN connection between a and a first user plane gateway GW-U, and the first message carries a TA identifier list corresponding to the first GW-U.

The processor 1702 is configured to determine that a TA identifier of a TA in which the UE is located is not in the TA identifier list; and configured to send, to the UE, a request message of re-establishing a PDN connection, where the request message is used to trigger the UE to initiate a second PDN connection, and the second PDN connection is a PDN connection between the UE and a second GW-U.

Optionally, the processor 1702 is further configured to send a request message of disconnecting the first PDN connection, where the request message carries a parameter that is used to indicate the UE to establish the second PDN connection.

In FIG. 17, a bus architecture (represented by using a bus 1700) may include any quantity of interconnected buses and bridges, and the bus 1700 connects together a circuit of one or more processors represented by the processor 1702 and a circuit of a memory represented by the memory 1703. The bus 1700 may further connect, for example, a peripheral device or a voltage stabilizer to various other circuits such as a power management circuit. These are well known in the art, and therefore are not further described in this specification any more. A bus interface 1704 provides an interface between the bus 1700 and the receiver 1701. The receiver 1701 may be a transceiver that provides a unit configured to communicate with various other apparatuses on a transmission medium.

The processor 1702 is responsible for managing the bus 1700 and general processing. The memory 1703 may be configured to store data that is used when the processor 1702 performs an operation.

Various variation manners and specific examples in the foregoing user plane gateway updating method in the embodiments of FIG. 8, FIG. 9A, and FIG. 9B are also applicable to the mobility management entity in this embodiment. According to the foregoing detailed description of the user plane gateway updating method, a person skilled in the art can clearly know an implementation method of the mobility management entity in this embodiment. Therefore, for brevity of the specification, details are not described herein.

Figure 18:
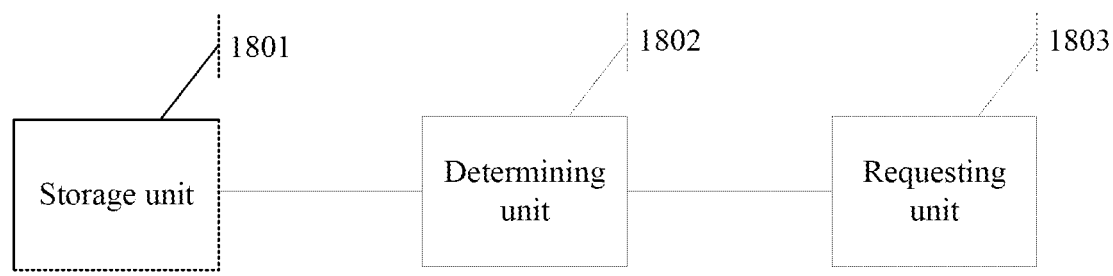
FIG. 18 is a fourth schematic module diagram of a user plane gateway updating apparatus according to an embodiment of the present disclosure.

Referring to FIG. 18, FIG. 18 is a fourth schematic module diagram of a user plane gateway updating apparatus according to an embodiment of the present disclosure. For a meaning of a term used in and specific implementation of the user plane gateway updating apparatus shown in FIG. 18, reference may be made to a related description of FIG. 1 to FIG. 11B and the foregoing embodiments. The apparatus may be the mobility management entity described above, and the apparatus includes a storage unit 1801, a determining unit 1802, and a requesting unit 1803.

The storage unit 1801 is configured to store a correspondence between each GW-U identifier and a tracking area TA identifier list in advance.

The determining unit 1802 is configured to: after a TA in which a UE is located changes, determine that an original TA in which the UE is located is corresponding to a first TA identifier, and determine that a new TA in which the UE is located is corresponding to a second TA identifier, where a first PDN connection is established between the UE and a first GW-U; and determine, according to the correspondence, that a TA list in which the first TA identifier is corresponding to a first GW-U identifier, and determine that a TA list in which the second TA identifier is corresponding to a second GW-U identifier.

The requesting unit 1803 is configured to: when the first GW-U corresponding to the first GW-U identifier is different from a second GW-U corresponding to the second GW-U identifier, send, to the UE, a request message of re-establishing a PDN connection, where the request message is used to trigger the UE to initiate a second PDN connection, and the second PDN connection is a PDN connection between the UE and the second GW-U.

Optionally, the requesting unit 1803 is configured to:
send, to the UE, a request message of disconnecting the first PDN connection, where the request message carries a parameter that is used to indicate the UE to establish the second PDN connection.

Various variation manners and specific examples in the foregoing user plane gateway updating method in the embodiments of FIG. 10, FIG. 11A, and FIG. 11B are also applicable to the user plane gateway updating apparatus in this embodiment. According to the foregoing detailed description of the user plane gateway updating method, a person skilled in the art can clearly know an implementation method of the user plane gateway updating apparatus in this embodiment. Therefore, for brevity of the specification, details are not described herein.

Figure 19:
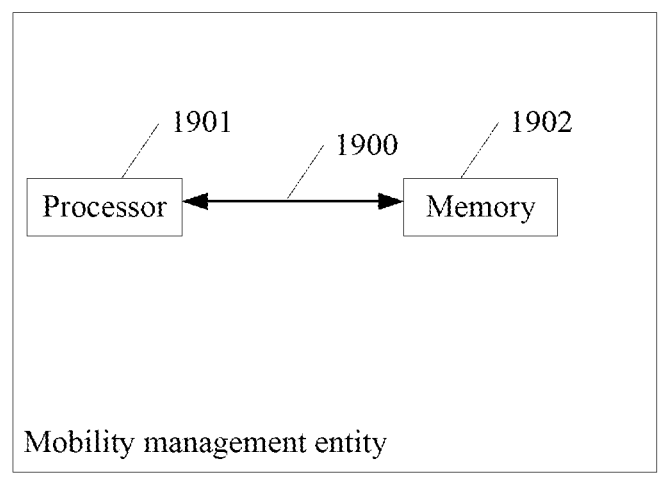
FIG. 19 is a second schematic structural diagram of a mobility management entity according to an embodiment of the present disclosure.

Referring to FIG. 19, FIG. 19 is a second schematic structural diagram of a mobility management entity according to an embodiment of the present disclosure. For a meaning of a term used in and specific implementation of the mobility management entity shown in FIG. 19, reference may be made to a related description of FIG. 1 to FIG. 11B and the foregoing embodiments. The mobility management entity may be the mobility management entity described above, and the mobility management entity includes a processor 1901 and a memory 1902.

The memory 1902 is configured to store a correspondence between each GW-U identifier and a tracking area TA identifier list in advance.

The processor 1901 is configured to: after a TA in which a UE is located changes, determine that an original TA in which the UE is located is corresponding to a first TA identifier, and determine that a new TA in which the UE is located is corresponding to a second TA identifier, where a first PDN connection is established between the UE and a first GW-U; and determine, according to the correspondence, that a TA list in which the first TA identifier is corresponding to a first GW-U identifier, and determine that a TA list in which the second TA identifier is corresponding to a second GW-U identifier; and configured to: when the first GW-U corresponding to the first GW-U identifier is different from a second GW-U corresponding to the second GW-U identifier, send, to the UE, a request message of re-establishing a PDN connection, where the request message is used to trigger the UE to initiate a second PDN connection, and the second PDN connection is a PDN connection between the UE and the second GW-U.

Optionally, the processor 1901 is further configured to send, to the UE, a request message of disconnecting the first PDN connection, where the request message carries a parameter that is used to indicate the UE to establish the second PDN connection.

In FIG. 19, a bus architecture (represented by using a bus 1900) may include any quantity of interconnected buses and bridges, and the bus 1900 connects together a circuit of one or more processors represented by the processor 1901 and a circuit of a memory represented by the memory 1902. The bus 1900 may further connect, for example, a peripheral device or a voltage stabilizer to various other circuits such as a power management circuit. These are well known in the art, and therefore are not further described in this specification any more.

The processor 1901 is responsible for managing the bus 1900 and general processing. The memory 1902 may be configured to store data that is used when the processor 1901 performs an operation.

Various variation manners and specific examples in the foregoing user plane gateway updating method in the embodiments of FIG. 10, FIG. 11A, and FIG. 11B are also applicable to the mobility management entity in this embodiment. According to the foregoing detailed description of the user plane gateway updating method, a person skilled in the art can clearly know an implementation method of the mobility management entity in this embodiment. Therefore, for brevity of the specification, details are not described herein.

It may be clearly understood by a person skilled in the art that, for the purpose of convenient and brief description, division of the foregoing function units is taken as an example for illustration. In actual application, the foregoing functions can be allocated to different function units and implemented according to a requirement, that is, an inner structure of an apparatus is divided into different function units to implement all or part of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit or the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several indications for indicating a computer device (which may be a personal computer, a server, a network device, or the like) or a processor to perform all or a part of the steps of the methods described in the embodiments of this application. The foregoing storage medium includes: any medium that can store program code, such as a USB flash drive, a portable hard disk, a ROM (read-only memory), a RAM (random access memory), a magnetic disk, or an optical disc.

The foregoing embodiments are merely used to describe the technical solutions of this application. The foregoing embodiments are merely intended to help understand the method and core idea of the present disclosure, and shall not be construed as a limitation on the present disclosure. Any variation or replacement readily figured out by a person skilled in the art within the technical scope disclosed in the present disclosure shall fall within the protection scope of the present disclosure.

The invention claimed is:

1. A communications method, comprising:
receiving, by a mobility management entity from a control plane gateway, a tracking area identifier list corresponding to a first user plane gateway in a process in which a first packet data network connection for a user equipment (UE) is being established, wherein the first packet data network connection connects the first user plane gateway;
sending, by the mobility management entity to the control plane gateway, a notification when a tracking area identifier of a tracking area in which the UE is located is not in the tracking area identifier list; and
receiving, by the mobility management entity from the control plane gateway, a message comprising a parameter indicating establishment of a second packet data network connection for the UE, wherein the second packet data network connection connects a second user plane gateway different from the first user plane gateway.

2. The method according to claim 1, wherein the message triggers the mobility management entity to delete the first packet data network connection.

3. The method according to claim 1, further comprising:
deleting, by the mobility management entity, the first packet data network connection after the message is received.

4. The method according to claim 1, wherein the parameter indicating establishment of the second packet data network connection is a cause value in the message, the cause value being set to "Reactivation Requested".

5. The method according to claim 1, further comprising:
sending, by the mobility management entity, the parameter indicating establishment of the second packet data network connection for the UE to the UE after the message is received.

6. The method according to claim 1, wherein the notification is for notifying the control plane gateway that the tracking area identifier of the tracking area in which the UE is located is not in the tracking area identifier list.

7. An apparatus, comprising:
a processor; and
a memory coupled to the processor, the memory comprising instructions that, when executed by the processor, configure the apparatus to:
receive from a control plane gateway, a tracking area identifier list corresponding to a first user plane gateway in a process in which a first packet data network connection for a user equipment (UE) is being established, wherein the first packet data network connection connects the first user plane gateway;
send, to the control plane gateway, a notification when a tracking area identifier of a tracking area in which the UE is located is not in the tracking area identifier list; and
receive, from the control plane gateway, a message comprising a parameter indicating establishment of a second packet data network connection for the UE, wherein the second packet data network connection connects a second user plane gateway different from the first user plane gateway.

8. The apparatus according to claim 7, wherein the message triggers the mobility management entity to delete the first packet data network connection.

9. The apparatus according to claim 7, wherein the instructions, when executed by the processor, further configure the apparatus to:
delete the first packet data network connection after the message is received.

10. The apparatus according to claim 7, wherein the parameter indicating establishment of the second packet data network connection is a cause value in the message, the cause value being set to "Reactivation Requested".

11. The apparatus according to claim 7, wherein the instructions, when executed by the processor, further configure the apparatus to:
send the parameter indicating establishment of the second packet data network connection for the UE to the UE after the message is received.

12. The method according to claim 7, wherein the notification is for notifying the control plane gateway that the tracking area identifier of the tracking area in which the UE is located is not in the tracking area identifier list.

13. A communications method, comprising:
sending, by a control plane gateway to a mobility management entity, a tracking area identifier list corresponding to a first user plane gateway in a process in which a first packet data network connection for a user equipment (UE) is being established, wherein the first packet data network connection connects the first user plane gateway;
receiving, by the control plane gateway from the mobility management entity, a notification notifying that a tracking area identifier of a tracking area in which the UE is located is not in the tracking area identifier list; and
sending, by the control plane gateway to the mobility management entity, a message comprising a parameter indicating establishment of a second packet data network connection for the UE, wherein the second packet data network connection connects a second user plane gateway different from the first user plane gateway.

14. The method according to claim 13, further comprising:
selecting, by the control plane gateway, the second user plane gateway for the second packet data network connection.

15. The method according to claim 13, wherein the message triggers the mobility management entity to delete the first packet data network connection.

16. The method according to claim 13, wherein the parameter indicating establishment of the second packet data network connection is a cause value in the message, the cause value being set to "Reactivation Requested".

17. An apparatus, comprising:
a processor; and
a memory coupled to the processor, the memory comprising instructions that, when executed by the processor, configure the apparatus to:
send, to a mobility management entity, a tracking area identifier list corresponding to a first user plane gateway in a process in which a first packet data network connection for a user equipment (UE) is being established, wherein the first packet data network connection connects the first user plane gateway;
receive, from the mobility management entity, a notification notifying that a tracking area identifier of a tracking area in which the UE is located is not in the tracking area identifier list; and send, to the mobility management entity, a message comprising a parameter for indicating establishment of a second packet data network connection for the UE, wherein the second packet data network connection connects a second user plane gateway different from the first user plane gateway.

18. The apparatus according to claim 17, wherein the instructions, when executed by the processor, further configure the apparatus to:

select the second user plane gateway for the second packet data network connection.

19. The apparatus according to claim 17, wherein the message triggers the mobility management entity to delete the first packet data network connection.

20. The apparatus according to claim 17, wherein the parameter indicating establishment of the second packet data network connection is a cause value in the message, the cause value being set to "Reactivation Requested".

* * * * *